(12) United States Patent
Nakabayashi

(10) Patent No.: US 12,542,198 B2
(45) Date of Patent: Feb. 3, 2026

(54) EVOLUTIONARY ALGORITHM FOR SEARCHING FOR A CHEMICAL STRUCTURE HAVING A TARGET PHYSICAL PROPERTY THAT MAINTAINS STRUCTURAL DIVERSITY AMONG CANDIDATES

(71) Applicant: FUJIFILM Corporation, Tokyo (JP)

(72) Inventor: Jun Nakabayashi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 1184 days.

(21) Appl. No.: 17/192,034

(22) Filed: Mar. 4, 2021

(65) Prior Publication Data

US 2021/0193274 A1    Jun. 24, 2021

Related U.S. Application Data

(63) Continuation of application No. PCT/JP2019/036074, filed on Sep. 13, 2019.

(30) Foreign Application Priority Data

Sep. 14, 2018 (JP) .................. 2018-172578

(51) Int. Cl.
  *G16C 20/64* (2019.01)
  *G06N 3/126* (2023.01)
  *G16C 20/40* (2019.01)

(52) U.S. Cl.
  CPC .............. *G16C 20/64* (2019.02); *G06N 3/126* (2013.01); *G16C 20/40* (2019.02)

(58) Field of Classification Search
  CPC ........ G16C 20/64; G16C 20/40; G16C 20/30; G16C 20/70; G16C 20/50; G06N 3/126; G06N 7/01; G06N 99/00

(Continued)

(56) References Cited

U.S. PATENT DOCUMENTS 5,434,796 A     7/1995  Weininger
2002/0052694 A1  5/2002  McGregor et al.

(Continued)

FOREIGN PATENT DOCUMENTS

JP    8-512159 A     12/1996
JP    2000-29858 A    1/2000

(Continued)

OTHER PUBLICATIONS

Nicolaou, Christodoulos A. "Graph design using knowledge-driven, self-adaptive multi-objective evolutionary graph algorithms." (2010) Dissertation. University of Cyprus. (Year: 2010).*

(Continued)

*Primary Examiner* — Brian S Cook
(74) *Attorney, Agent, or Firm* — Birch, Stewart, Kolasch & Birch, LLP

(57) ABSTRACT

An object of the present invention is to provide a method for searching a compound, a program for searching a compound, a recording medium, and a device for searching a compound, which are capable of efficiently searching a structure of a compound. In the method for searching a compound according to the first aspect, because of performing a first adoption process to determine based on whether or not a physical property value of a candidate structure approaches a target value of a physical property value due to a change in chemical structure, in a case where the candidate structure is not adopted as a result of the first adoption process, performing a second adoption process to determine based on whether or not a structural diversity increases, and in a case where the candidate structure is not adopted as a result of the first adoption process and the second adoption process, performing a rejection process to reject the change in chemical structure and return to the chemical structure before the change, it is possible to improve the structural (Continued)

diversity to promote escape from local minimum, and efficiently search for the structure of the compound having a desired physical property value (target value).

12 Claims, 19 Drawing Sheets

(58) Field of Classification Search
USPC .......................................................... 703/13
See application file for complete search history.

(56) References Cited

U.S. PATENT DOCUMENTS

| | | | |
|---|---|---|---|
| 2004/0083060 | A1 | 4/2004 | Church et al. |
| 2008/0027652 | A1 | 1/2008 | Cramer et al. |
| 2010/0145896 | A1 | 6/2010 | Yuta |
| 2010/0312538 | A1 | 12/2010 | Umeyama et al. |
| 2011/0029296 | A1 | 2/2011 | Ciloy et al. |
| 2012/0330632 | A1* | 12/2012 | Oganov ............. G06N 3/126 703/2 |
| 2013/0226549 | A1 | 8/2013 | Tseng et al. |
| 2015/0152763 | A1 | 6/2015 | Sugio |
| 2015/0310162 | A1 | 10/2015 | Okuno et al. |
| 2017/0124482 | A1 | 5/2017 | Yoo et al. |
| 2018/0052979 | A1 | 2/2018 | Bito et al. |

FOREIGN PATENT DOCUMENTS

| | | |
|---|---|---|
| JP | 2002-514811 A | 5/2002 |
| JP | 2002-530727 A | 9/2002 |
| JP | 2003-206246 A | 7/2003 |
| JP | 5083320 B2 | 11/2012 |
| JP | 2017-91526 A | 5/2017 |
| JP | 2018-32077 A | 3/2018 |
| WO | WO 99/59061 A1 | 11/1999 |
| WO | WO 00/39751 A2 | 7/2000 |
| WO | WO 2009/064015 A1 | 5/2009 |
| WO | WO 2014/034577 A1 | 3/2014 |

OTHER PUBLICATIONS

Globus, A., Lawton, J., & Wipke, T. "Automatic molecular design using evolutionary techniques". Nanotechnology, 10(3), 290 (1999 IOP Publishing Ltd). pp. 290-299. (Year: 1999).*
Turner, David B., Simon M. Tyrrell, and Peter Willett. "Rapid quantification of molecular diversity for selective database acquisition." Journal of chemical information and computer sciences 37, No. 1 (1997): 18-22. (Year: 1997).*
Fonseca, Carlos M., and Peter J. Fleming. "Multiobjective optimization and multiple constraint handling with evolutionary algorithms. I. A unified formulation." IEEE Transactions on Systems, Man, and Cybernetics-Part A: Systems and Humans 28, No. 1 (1998): 26-37. (Year: 1998).*
Ertl et al., "Estimation of synthetic accessibility score of drug-like molecules based on molecular complexity and fragment contributions," Journal of Cheminformatics, vol. 1, No. 8, Jun. 10, 2009, pp. 1-11.
International Preliminary Report on Patentability and Written Opinion of the International Searching Authority (Forms PCT/IB/326, PCT/IB/373, and PCT/ISA/237) for International Application No. PCT/JP2018/036072, dated Mar. 25, 2021, with English translation of the Written Opinion.
International Preliminary Report on Patentability and Written Opinion of the International Searching Authority (Forms PCT/IB/326, PCT/IB/373, and PCT/ISA/237) for International Application No. PCT/JP2019/036073, dated Mar. 25, 2021, With English translation of the Written Opinion.
International Search Report (Form PCT/ISA/210) for International Application No. PCT/JP2019/036072, dated Dec. 3, 2019, with English translation.

International Search Report (PCT/ISA/210) for International Application No. PCT/JP2019/036073, dated Dec. 10, 2019, with English translation.
Kawai et al., "Molecu ar Evolutionary Algorithm for Structure Design and Structure Generation," J. Comput. Chem. Jpn., vol. 10, No. 1, 2011, pp. 25-31 (7 pages total), with English abstract.
Kyoto Constella Technologies Co., Ltd., "ReCGen (Refined Compound Generalor)," URL:http://recgen/czeek.jp/recgen, retrieved Jul. 23, 2018. 4 pages total.
Tanimura, "De novo drug design that approached the stage of maturation," CICSJ Bulletin, vol. 28, No. 3, 2010, pp. 57-61.
Indian Office Action for Indian Application No. 202147010005, dated Jun. 27, 2023, with English translation.
Indian Office Action for Indian Application No. 202147010005, dated Mar. 14, 2024, with an English translation.
Indian Office Action for Indian Application No. 202147010004, dated Nov. 17, 2022, with an English translation.
Ikebata et al., "Bayesian molecular design with a chemical language model," J. Comput. Aided Mol. Des., vol. 31, No. 4, Apr. 2017 (published online Mar. 9, 2017), pp. 379-391.
International Preliminary Report on Patentability and Written Opinion of the International Searching Authority (Forms PCT/IB/326, PCT/IB/373 and PCT/ISA/237) for International Application No. PCT/JP2019/036074, dated Mar. 25, 2021, with English translation of the Written Opinion.
International Search Report (Form PCT/ISA/210) for International Application No. PCT/JP2019/036074, dated Dec. 17, 2019, with English translation.
Matsuyama et al., "Development of a molecular fingerprint ensemble method for discovery of active compounds with diverse structures," IPSJ Technical Report: Bioinformatics, vol. 2018-BIO-53, No. 9, Mar. 2, 2018, pp. 1-6 (8 pages total), with English abstract.
Japanese Notice of Reasons for Refusal for corresponding Japanese Application No. 2020-546219, dated Apr. 26, 2022, with an English translation.
Indian Office Action for Indian Application No. 202147009975, dated Jan. 6, 2023, with an English translation.
Japanese Notice of Reasons for Refusal for Japanese Application No. 2020-546217, dated Jun. 10, 2022, with an English translation.
Japanese Notice of Reasons for Refusal for Japanese Application No. 2020-546218, dated Jun. 6, 2022, with an English translation.
Boda et al., "Structure and reaction based evaluation of synthetic accessibility," J Comput Aided Mol Des, vol. 21, 2007 (Published online Feb. 9, 2007), pp. 311-325.
Extended European Search Report for European Application No. 19858853.5, dated Sep. 17, 2021.
Extended European Search Report for European Application No. 19859449.1, dated Sep. 24, 2021.
Extended European Search Report for European Application No. 19860042.1, dated Oct. 7, 2021.
Globus et al., "Automatic molecular design using evolutionary techniques," Nanotechnology, vol. 10, 1999 (Received on Mar. 17, 1999), pp. 290-299, XP-000878962.
Olivecrona et al., "Molecular de-nevo design through deep reinforcement learning," Journal of Cheminformatics, vol. 9, No. 48, 2017, pp. 1-14.
U.S. Office Action for U.S. Appl. No. 17/192,484, dated Oct. 12, 2023.
Indian Office Action for Indian Application No. 202147010004, dated Dec. 26, 2023, with English translation.
U.S. Notice of Allowance for U.S. Appl. No. 17/192,484, dated Mar. 6, 2024.
European Communication pursuant to Article 94(3) EPC fo European Application No. 19859449.1, dated Aug. 27, 2024.
European Communication pursuant to Article 94(3) EPC for European Application No. 19858853.5, dated Aug. 27, 2024.
European Communication pursuant to Article 94(3) EPC for European Application No. 19860042.1, dated Sep. 6, 2024.
U.S. Office Action for U.S. Appl. No. 17/192,530, dated Jul. 18, 2024,.
Yesselman et al., "MATCH: An Atom-Typing Toolset for Molecular Mechanics Force Fields," Journal of Computational Chemistry, vol. 33, No. 2, 2012, pp. 189-202.

(56) References Cited

OTHER PUBLICATIONS

U.S. Office Action for U.S. Appl. No. 17/192,530, dated Feb. 11, 2025.
Indian Office Action for counterpart Indian Application No. 202147009975, dated Mar. 12, 2025, with an English translation.
Indian Office Action for counterpart Indian Application No. 202147010005, dated Mar. 25, 2025, with an English translation.
English translation of the Indian Decision of Refusal for Indian Application No. 202147010005, dated Aug. 29, 2025.
U.S. Office Action for U.S. Appl. No. 17/192,530, dated Oct. 1, 2025.

* cited by examiner

× 25 ($\lambda_{max}$=207(nm))

$\lambda_{max}$=200(nm) (Gaussian16、PM6、ZINDO)

FIG. 5
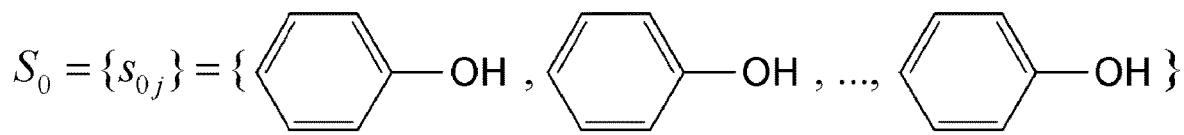
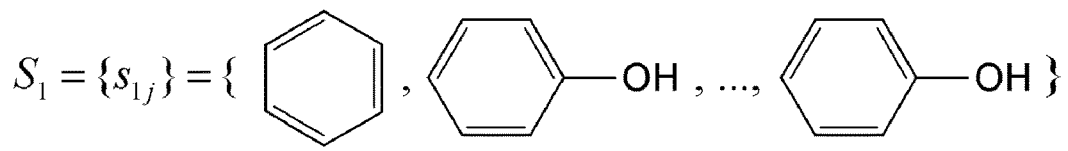
FIG. 6
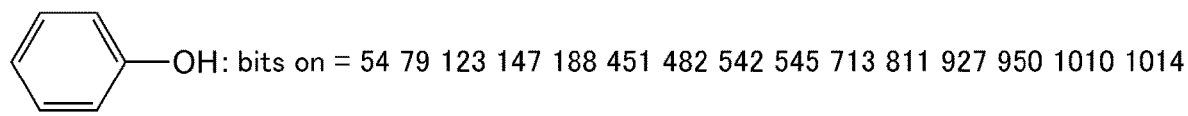: bits on = 54 79 123 147 188 451 482 542 545 713 811 927 950 1010 1014
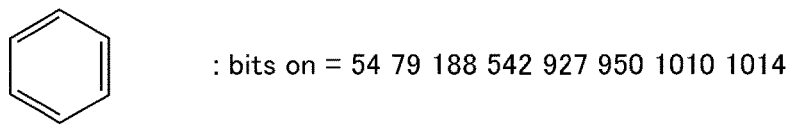 : bits on = 54 79 188 542 927 950 1010 1014
FIG. 7
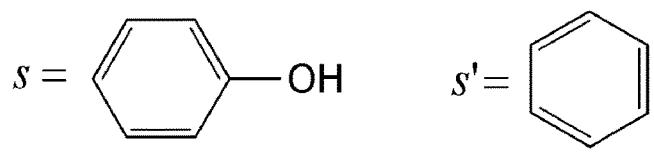
FIG. 8
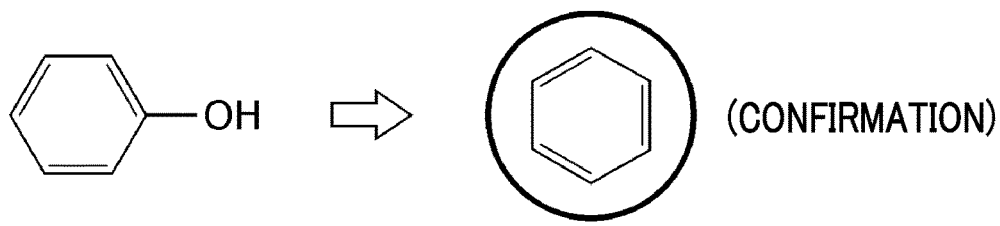 (CONFIRMATION)
FIG. 9
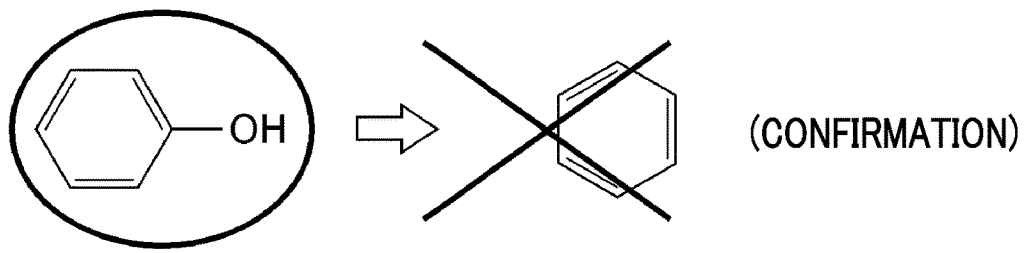 (CONFIRMATION)

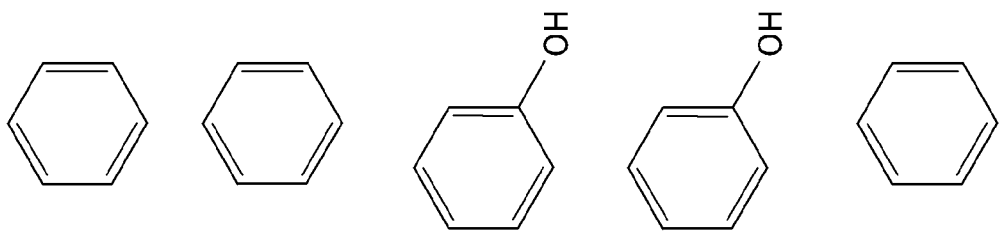
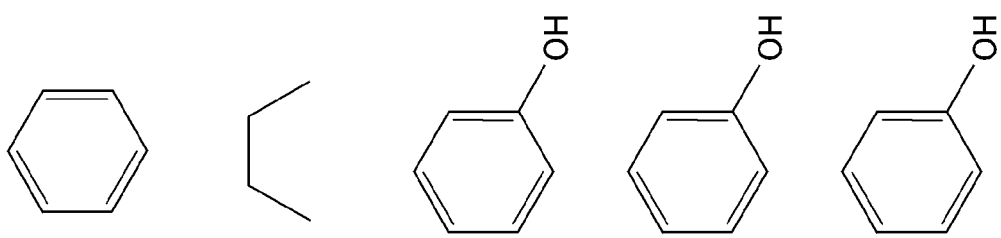
FIG. 10
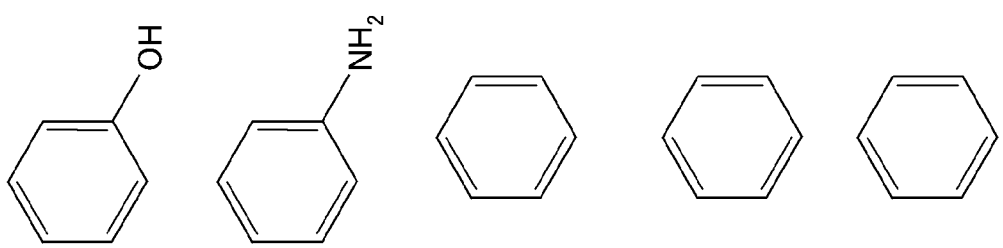
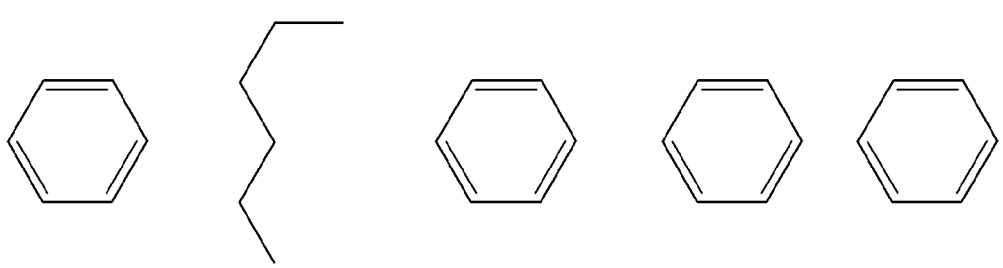
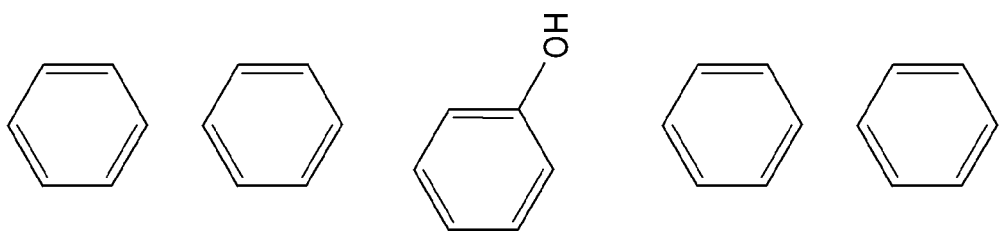

λmax=208(nm) (Gaussian16、PM6、ZINDO)

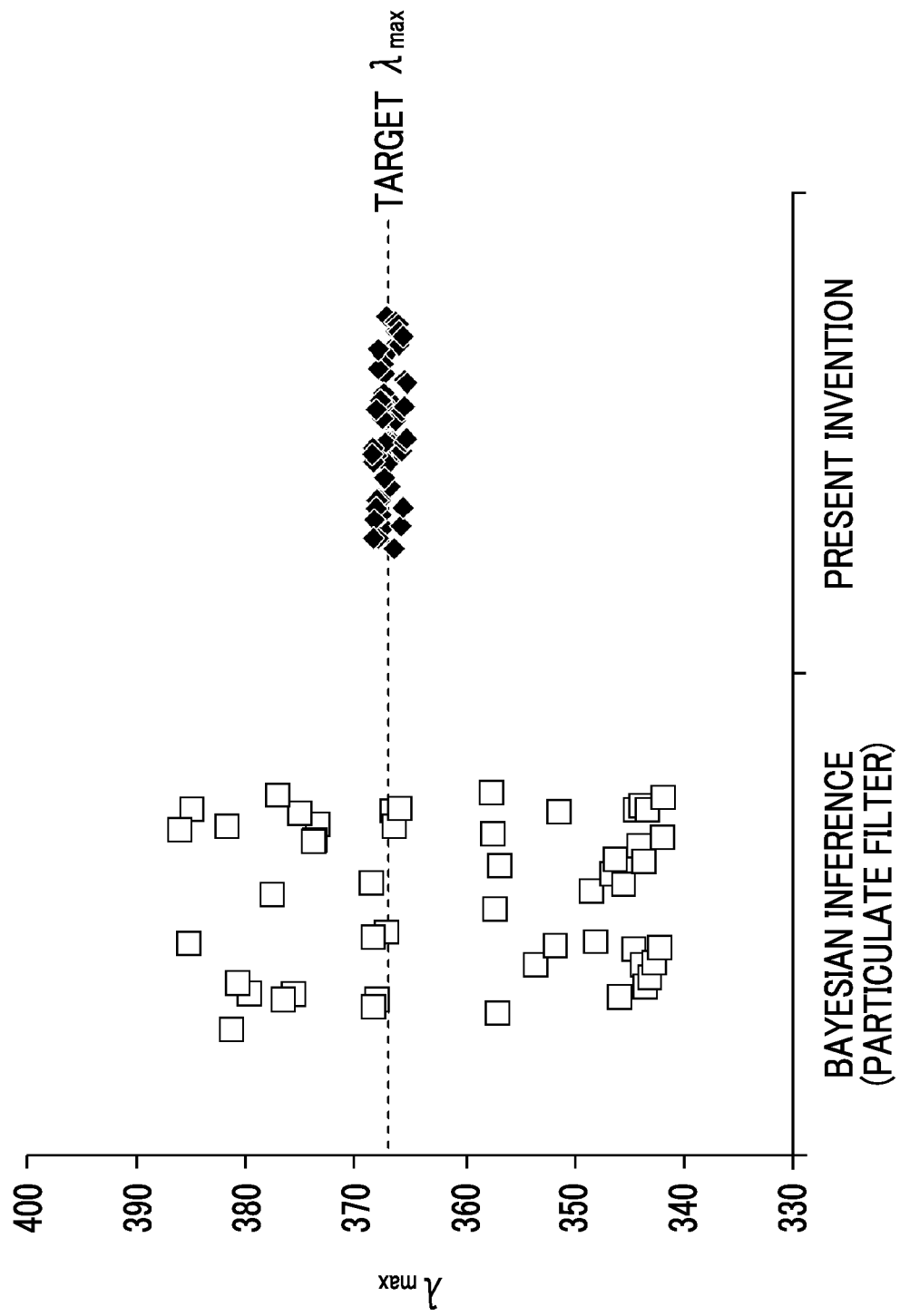

FIG. 18

| | AVERAGE VALUE OF TOP 20 COMPOUNDS | STANDARD DEVIATION OF TOP 20 COMPOUNDS |
|---|---|---|
| $\lambda_{max}$ [nm] | 366.8 | 0.7 |
| Tanimoto COEFFICIENT WITH METHYL YELLOW | 0.078 | 0.025 |

FIG. 23 -PRIOR ART-

| INITIAL STRUCTURE FORMULA | STRUCTURE FORMULA IN 10TH TRIAL |
|---|---|
| c1c2N(C)C(=O)C(c3ccc()cc3)(c3ccccc3)O)C(CC1)CCC2 | C1CC(C2N1CC=C2CO)CN(C(=O) |
| c1c(c2(OC(=O)C)CC)CCN(C2C)O)cccc1 | C1CC(CNC=O)CN1(CC) |
| COc1ccc(NC(=O)CC(=O)C)cc1 | C1CC(C2N1CC=C2CO)CNC |
| CC1CCC(O)C(=O)O1 | C1CC(C2N1CC=C2CO)CNC(=O) |
| C(=O)C(=O)CC(C)C | C1CC(CNC=O)C2N1CCS2 |
| CCCCCCCCCCCCCCCC | C1CC(C2N1CC=C2CO)(CNC(=O)NC) |
| c12CC3C(=C)C(c1ccc(=O)[nH]2)(CC(=C3)C)N | C1CC(C2N1CC=C2CO)C |
| c1cza(cc(C1N3CCN(CC3)CC(=O)c3cc4c(cc3)OCO4)c1)OCO2 | C1CC(C2N1CC=C2CO)CNC(=O) |
| C(=O)OCCN(C(CO)C)C(c1cccc1)(c1cccc1)OC | C1CC(C2N1CC=C2CO)CNC(=O)occcc |
| c1c(z2cccc2)c(cc1O)O | C1CC(C2N1CC=C2CO)CNC |
| C1CC2(OC(C(C(C1)C1(C=CC(=O)C1)C=C3)CCC2O | C1CC(C2N1CC=C2CO)CNC(=O)occccnc |
| C1CC2(CO)C3N(C1)CCc1ccc13n(c3c1ccc3)C(=O)C2 | C1CC(C2N1CC=C2CO)CNC |
| Fc1c(c(cc1F)N)F)F | C1CC(C2N1CC=C2CO)CNC(=O)OC |
| cccccccc(=O)CF | C1CC(C2N1CC=C2CO)CNC(=O)OC |
| C1C(=O)C=C(C)c1 | C1CC(C2N1CC=C2CO)CNC(=O)OC) |
| CC123O(CC4(OC(=O)C)(CCC4)CCC1=CC(=O)C=C2)C(=O)C)O | C1CC(C2N1CC=C2CO)CNC(=O) |
| NC(=NO)CC1cccc1)N | C1CC(C2N1CC=C2CO)CNC(=O)OC |
| c1c(cccc)cc(c2c10c(C1C=c((C1)S)(C)0 | C1CC(C2N1CC=C2CO)CNC(=O) |
| c(=O)(ccccccccccc(=O)occcccccc | C1CC(C2N1CC=C2CO)CNC(=O)OC |
| c1CC(C2N1CC=C2CO)O | C1CC(C2N1CC=C2CO)CNC(=O)OC |
| C(O)C(=O)C)C(=O)N | C1CC(CNC=O)CN1(CC=C) |
| C1(=CCCC)C1=C(C(=O)O1)C | C1CC(C2N1CC=C2CO)C |
| O=c(c1cncc1)NNcNNC(=O)c1cncc1 | C1CC(CNC=O)CN1(CC=C) |
| c1c(C(=O)occccc)ccc(c1)O | C1CC(C2N1CC=C2CO)(CNC(=O)N1CC1)C |

US 12,542,198 B2

EVOLUTIONARY ALGORITHM FOR SEARCHING FOR A CHEMICAL STRUCTURE HAVING A TARGET PHYSICAL PROPERTY THAT MAINTAINS STRUCTURAL DIVERSITY AMONG CANDIDATES

CROSS-REFERENCE TO RELATED APPLICATIONS

The present application is a Continuation of PCT International Application No. PCT/JP2019/036074 filed on Sep. 13, 2019 claiming priority under 35 U.S.C § 119(a) to Japanese Patent Application No. 2018-172578 filed on Sep. 14, 2018. Each of the above applications is hereby expressly incorporated by reference, in its entirety, into the present application.

BACKGROUND OF THE INVENTION

1. Field of the Invention

The present invention relates to a method for searching a compound, a program for searching a compound, a recording medium, and a device for searching a compound, and particularly relates to a technique for searching a structure of a compound having a desired physical property value.

2. Description of the Related Art

In the related art, the search for a structure of a compound having a desired physical property value has been performed mainly by solving a "forward problem" (giving a molecular structure as a cause of the problem and obtaining a physical property value as a result), but with the development of informatics in recent years, studies on a solution method of an "inverse problem" (giving a physical property value and obtaining a molecular structure having the physical property value) are rapidly progressing. For example, "Bayesian molecular design with a chemical language model", Hisaki Ikebata et al., "searched on Jul. 23, 2018", internet is known for searching for a structure by solving the inverse problem. The "Bayesian molecular design with a chemical language model", Hisaki Ikebata et al., "searched on Jul. 23, 2018", internet discloses that a structure having a physical property value close to the target value is obtained by, giving a target value of physical property value, (1) generating a plurality of initial structures (chemical structures), (2) randomly changing each structure, (3) estimating the physical property value of each structure, and (4) adopting or rejecting the change in structure based on the distance between the physical property value and the target value (in this process, the processes (2) to (4) are repeated).

SUMMARY OF THE INVENTION

The Inverse Quantitative Structure-Property Relationship (iqspr) disclosed in the "Bayesian molecular design with a chemical language model", Hisaki Ikebata et al., "searched on Jul. 23, 2018", internet has a problem that the search efficiency is immediately lowered. For example, FIG. 21 is a diagram showing search results of a compound having a first excitation energy (57.2 kcal/mol) corresponding to a wavelength of 500 nm (mean values of top 100 compounds in each trial calculated by ZINDO using a quantum chemistry calculation software "Gaussian16" is plotted). In the iqspr, as shown in FIG. 21, the search quickly falls into a local minimum (state in which the physical property value moves away from the target value no matter how the structure is minutely changed), which slows the search. The cause of this slow search lies in a structural update algorithm (particulate filter based on Bayesian inference). FIGS. 22A to 22C are conceptual diagrams showing the algorithm of the particulate filter, and in a case where weight is calculated based on the physical property value from an initial state shown in FIG. 22A, a state shown in FIG. 22B is obtained. In a case where sampling with replacement is performed from this state based on the weight (extraction of the same structure is accepted), as shown in FIG. 22C, the structures C and D in which physical property values move away from the target are removed.

In addition, FIG. 23 is a table showing an example of the relationship between the initial structural formula of the compound (left column) and the structural formula of the 10th trial (right column), and shows a state in which all the structures are similar as the trials are repeated even though various structures are given in the initial state. As shown in FIGS. 21 to 23, in the structural update based on Bayesian inference, although the physical property value approaches the target value, the diversity of structures for search is reduced, the search falls into the local minimum, and even in a case where the trial is repeated, it is not possible to escape from the local minimum state (it is not possible to reach the final structure).

As described above, in the technique in the related art, it is not possible to efficiently search for the structure of the compound.

The present invention has been studied in view of such circumstances, and an object of the present invention is to provide a method for searching a compound, a program for searching a compound, a recording medium, and a device for searching a compound, which are capable of efficiently searching a structure of a compound.

In order to achieve the above-described object, a method for searching a compound according to a first aspect of the present invention includes:

an input step of inputting a chemical structure of one or more compounds, one or more physical property values according to the chemical structure, and a target value of the physical property values;

a candidate structure acquisition step of acquiring a candidate structure by changing the chemical structure;

a physical property value calculation step of calculating the physical property value of the candidate structure;

a candidate structure adoption step in which the candidate structure is adopted or rejected, including, performing a first adoption process to determine whether to or not to adopt the candidate structure based on whether or not the physical property value of the candidate structure approaches the target value of the physical property value due to the change in chemical structure, in a case where the candidate structure is not adopted by the first adoption process, performing a second adoption process to determine whether to or not to adopt the candidate structure based on whether or not a structural diversity of a structural group composed of the chemical structure and the candidate structure increases due to the change in chemical structure, and in a case where the candidate structure is not adopted by the first adoption process and the second adoption process, performing a rejection process to reject the change in chemical structure and return to the chemical structure before the change; and a control step of repeating the processes in the input step, the candidate structure acquisition step, the physical property value calculation step, and the candidate structure adoption step until a termination condition is satisfied.

In the first aspect, because of performing the first adoption process to determine whether to or not to adopt the candidate structure based on whether or not the physical property value of the candidate structure approaches the target value of the physical property value due to the change in chemical structure, in a case where the candidate structure is not adopted as a result of the first adoption process, performing the second adoption process to determine the adoption based on whether or not the structural diversity increases, and in a case where the candidate structure is not adopted as a result of the first adoption process and the second adoption process, performing the rejection process to reject the change in chemical structure and return to the chemical structure before the change, it is possible to promote escape from the local minimum based on the diversity of structures, and efficiently search for the structure of the compound having a desired physical property value (target value).

In the first aspect and each aspect, the "chemical structure" includes a structure (initial structure) in an initial state, and also includes a structure in which the initial structure is changed by repeating the processes.

In order to achieve the above-described object, a method for searching a compound according to a second aspect of the present invention includes:

an input step of inputting a chemical structure of one or more compounds, one or more physical property values according to the chemical structure, and a target value of the physical property values;

a candidate structure acquisition step of acquiring a candidate structure by changing the chemical structure;

a physical property value calculation step of calculating the physical property value of the candidate structure;

a candidate structure adoption step in which the candidate structure is adopted or rejected, including, performing a second adoption process to determine whether to or not to adopt the candidate structure based on whether or not a structural diversity of a structural group composed of the chemical structure and the candidate structure increases due to the change in chemical structure, in a case where the candidate structure is not adopted by the second adoption process, performing a first adoption process to determine whether to or not to adopt the candidate structure based on whether or not the physical property value of the candidate structure approaches the target value of the physical property value due to the change in chemical structure, and in a case where the candidate structure is not adopted by the first adoption process and the second adoption process, performing a rejection process to reject the change in chemical structure and return to the chemical structure before the change; and a control step of repeating the processes in the input step, the candidate structure acquisition step, the physical property value calculation step, and the candidate structure adoption step until a termination condition is satisfied.

In the second aspect, the second adoption process to determine whether to or not to adopt the candidate structure based on whether or not the structural diversity of the structural group composed of the chemical structure and the candidate structure increases due to the change in chemical structure is performed; in a case where the candidate structure is not adopted by the second adoption process, the first adoption process to determine whether to or not to adopt the candidate structure based on whether or not the physical property value of the candidate structure approaches the target value of the physical property value due to the change in chemical structure is performed; and in a case where the candidate structure is not adopted by the first adoption process and the second adoption process, the rejection process to reject the change in chemical structure and return to the chemical structure before the change is performed. That is, the order of the first and second adoption processes is different from that of the first aspect (the details of the first and second adoption processes are the same as those in the first aspect). Even in a case of such an aspect, as in the first aspect, it is possible to promote escape from the local minimum based on the diversity of structures, and efficiently search for the structure of the compound having a desired physical property value (target value).

A method for searching a compound according to a third aspect includes that, in the first aspect or the second aspect, as the first adoption process in the candidate structure adoption step, in a case where an absolute value of a difference (first difference) between the physical property value of the candidate structure and the target value of the physical property value is equal to or less than an absolute value of a difference (second difference) between the physical property value of the chemical structure and the target value of the physical property value, a process of adopting the candidate structure is performed, and in a case where the absolute value of the difference (first difference) between the physical property value of the candidate structure and the target value of the physical property value is more than the absolute value of the difference (second difference) between the physical property value of the chemical structure and the target value of the physical property value, a process of calculating a first adoption probability from a first function based on the difference (first difference) between the physical property value of the candidate structure and the target value of the physical property value and adopting the candidate structure with the first adoption probability is performed. In the third aspect, the case where the absolute value of the first difference is equal to or less than the absolute value of the second difference is a case where the physical property value does not move away from the target value due to the change in structure, thereby adopting the candidate structure. On the other hand, the case where the absolute value of the first difference is more than the absolute value of the second difference is a case where the physical property value moves away from the target value due to the change in structure, thereby adopting the first adoption probability.

A method for searching a compound according to a fourth aspect includes that, in the third aspect, the first function is a monotonically decreasing function with respect to a difference (third difference) between the absolute value of the difference (first difference) between the physical property value of the candidate structure and the target value of the physical property value, and the absolute value of the difference (second difference) between the physical property value of the chemical structure and the target value of the physical property value. In the fourth aspect, since the first function is a monotonically decreasing function with respect to the third difference, as the third difference is larger (that is, as the physical property value further moves away from the target value due to the change in structure), the adoption probability is lowered.

In order to achieve the above-described object, a method for searching a compound according to a fifth aspect of the present invention includes:

an input step of inputting a chemical structure of one or more compounds, one or more physical property values according to the chemical structure, and a target value of the physical property values;

a candidate structure acquisition step of acquiring a candidate structure by changing the chemical structure;

a physical property value calculation step of calculating the physical property value of the candidate structure;

a candidate structure adoption step in which the candidate structure is adopted or rejected, including, performing a first calculation process, in which a first adoption probability used for adopting the candidate structure is calculated based on whether or not the physical property value of the candidate structure approaches the target value of the physical property value due to the change in chemical structure, and a second calculation process, in which a second adoption probability used for adopting the candidate structure is calculated based on whether or not a structural diversity of a structural group composed of the chemical structure and the candidate structure increases due to the change in chemical structure, performing an adoption process to adopt the candidate structure based on the first adoption probability and the second adoption probability, and in a case where the candidate structure is not adopted as a result of the adoption process, performing a rejection process to reject the change in chemical structure and return to the chemical structure before the change; and a control step of repeating the processes in the input step, the candidate structure acquisition step, the physical property value calculation step, and the candidate structure adoption step until a termination condition is satisfied.

The fifth aspect is different from the first and second aspects in that the first and second calculation processes are performed simultaneously, and the candidate structure is adopted based on the first and second adoption probabilities. Even in a case of such an aspect, as in the first and second aspects, it is possible to promote escape from the local minimum based on the diversity of structures, and efficiently search for the structure of the compound having a desired physical property value (target value).

A method for searching a compound according to a sixth aspect includes that, in the candidate structure adoption step in the fifth aspect, in a case where an absolute value of a difference between the physical property value of the candidate structure and the target value of the physical property value is equal to or less than an absolute value of a difference between the physical property value of the chemical structure and the target value of the physical property value, a process of adopting the candidate structure is performed, and in a case where the absolute value of the difference between the physical property value of the candidate structure and the target value of the physical property value is more than the absolute value of the difference between the physical property value of the chemical structure and the target value of the physical property value, a process of calculating the first adoption probability from a first function based on the difference between the physical property value of the candidate structure and the target value of the physical property value, and a process of calculating an increase or decrease amount in the structural diversity of the structural group and calculating the second adoption probability from a second function based on the increase or decrease amount are performed.

A method for searching a compound according to a seventh aspect includes that, in the candidate structure adoption step in the fourth or sixth aspect, a difference between a structural diversity of a first structural group composed of chemical structures before the change and a structural diversity of a second structural group composed of chemical structures after at least one change is calculated as the increase or decrease amount.

A method for searching a compound according to an eighth aspect includes that, in the candidate structure adoption step in the fourth or sixth aspect, a difference between a structural diversity of a first structural group including at least a part of structural groups after at least one change and a structural diversity of a second structural group obtained by adding the candidate structure to the first structural group is calculated as the increase or decrease amount.

A method for searching a compound according to a ninth aspect includes that, in the third or sixth aspect, the first function is a monotonically decreasing function with respect to the difference between the absolute value of the difference between the physical property value of the candidate structure and the target value of the physical property value, and the absolute value of the difference between the physical property value of the chemical structure and the target value of the physical property value.

A method for searching a compound according to a tenth aspect includes that, in the fourth or sixth aspect, the second function is a monotonically increasing function with respect to the increase or decrease amount in the structural diversity.

A method for searching a compound according to an eleventh aspect includes that, in the candidate structure acquisition step in any one of the first to tenth aspects, an atom or an atomic group is added to or deleted from the chemical structure to generate an objective structure, and the objective structure is defined as the candidate structure. The eleventh aspect defines a method for generating an objective structure. The addition or deletion may be performed in a unit of one atom, or in a unit of an atomic group (group of two or more atoms).

A method for searching a compound according to a twelfth aspect includes that, in the control step in any one of the first to eleventh aspects, the termination condition is determined to be satisfied in a case where the number of times that the chemical structure is changed reaches a specified number of times and/or a case the physical property value of the candidate structure reaches the target value, and the processes of the input step, the candidate structure acquisition step, the physical property value calculation step, and the candidate structure adoption step are terminated. The twelfth aspect specifically defines the termination condition.

In order to achieve the above-described object, a program for searching a compound according to a thirteenth aspect of the present invention causes a computer to execute the method for searching a compound according to any one of the first to twelfth aspects. According to the thirteenth aspect, by the method for searching a compound according to any one of the first to twelfth aspects, it is possible to efficiently search for the structure of the compound having a desired physical property value. The "computer" in the thirteenth aspect can be realized by using one or more various processors such as a central processing unit (CPU).

In order to achieve the above-described object, a non-temporary and computer-readable recording medium according to a fourteenth aspect of the present invention causes a computer to execute the program according to the thirteenth aspect in a case where a command stored in the recording medium is read by the computer. The recording medium according to the fourteenth aspect can be realized by recording a computer-readable code of the program according to the thirteenth aspect.

In order to achieve the above-described object, a device for searching a compound according to a fifteenth aspect of the present invention includes:
  an input part of inputting a chemical structure of one or more compounds, one or more physical property values according to the chemical structure, and a target value of the physical property values;
  a candidate structure acquisition part of acquiring a candidate structure by changing the chemical structure;
  a physical property value calculation part of calculating the physical property value of the candidate structure;
  a candidate structure adoption part in which the candidate structure is adopted or rejected, including,
    performing a first adoption process to determine whether to or not to adopt the candidate structure based on whether or not the physical property value of the candidate structure approaches the target value of the physical property value due to the change in chemical structure,
    in a case where the candidate structure is not adopted by the first adoption process, performing a second adoption process to determine whether to or not to adopt the candidate structure based on whether or not a structural diversity of a structural group composed of the chemical structure and the candidate structure increases due to the change in chemical structure, and
    in a case where the candidate structure is not adopted by the first adoption process and the second adoption process, performing a rejection process to reject the change in chemical structure and return to the chemical structure before the change; and
  a control part of repeating the processes in the input part, the candidate structure acquisition part, the physical property value calculation part, and the candidate structure adoption part until a termination condition is satisfied. According to the fifteenth aspect, as the first aspect, it is possible to efficiently search for the structure of the compound having a desired property. The device for searching a compound according to the fifteenth aspect may further include the same configurations as in the third to fourth, and seventh to twelfth aspects.

In order to achieve the above-described object, a device for searching a compound according to a sixteenth aspect of the present invention includes:
  an input part of inputting a chemical structure of one or more compounds, one or more physical property values according to the chemical structure, and a target value of the physical property values;
  a candidate structure acquisition part of acquiring a candidate structure by changing the chemical structure;
  a physical property value calculation part of calculating the physical property value of the candidate structure;
  a candidate structure adoption part in which the candidate structure is adopted or rejected, including,
    performing a second adoption process to determine whether to or not to adopt the candidate structure based on whether or not a structural diversity of a structural group composed of the chemical structure and the candidate structure increases due to the change in chemical structure,
    in a case where the candidate structure is not adopted by the second adoption process, performing a first adoption process to determine whether to or not to adopt the candidate structure based on whether or not the physical property value of the candidate structure approaches the target value of the physical property value due to the change in chemical structure, and
    in a case where the candidate structure is not adopted by the first adoption process and the second adoption process, performing a rejection process to reject the change in chemical structure and return to the chemical structure before the change; and
  a control part of repeating the processes in the input part, the candidate structure acquisition part, the physical property value calculation part, and the candidate structure adoption part until a termination condition is satisfied. According to the sixteenth aspect, as the second aspect, it is possible to efficiently search for the structure of the compound having a desired property. The device for searching a compound according to the sixteenth aspect may further include the same configurations as in the third to fourth, and seventh to twelfth aspects.

In order to achieve the above-described object, a device for searching a compound according to a seventeenth aspect of the present invention includes:
  an input part of inputting a chemical structure of one or more compounds, one or more physical property values according to the chemical structure, and a target value of the physical property values;
  a candidate structure acquisition part of acquiring a candidate structure by changing the chemical structure;
  a physical property value calculation part of calculating the physical property value of the candidate structure;
  a candidate structure adoption part in which the candidate structure is adopted or rejected, including,
    simultaneously performing a first calculation process, in which a first adoption probability of adopting the candidate structure is calculated based on whether or not the physical property value of the candidate structure approaches the target value of the physical property value due to the change in chemical structure, and a second calculation process, in which a second adoption probability of adopting the candidate structure is calculated based on whether or not a structural diversity of a structural group composed of the chemical structure and the candidate structure increases due to the change in chemical structure, performing an adoption process to adopt the candidate structure based on the first adoption probability and the second adoption probability, and in a case where the candidate structure is not adopted as a result of the adoption process, performing a rejection process to reject the change in chemical structure and return to the chemical structure before the change; and a control part of repeating the processes in the input part, the candidate structure acquisition part, the physical property value calculation part, and the candidate structure adoption part until a termination condition is satisfied. According to the seventeenth aspect, as the fifth aspect, it is possible to efficiently search for the structure of the compound having a desired property. The device for searching a compound according to the seventeenth aspect may further include the same configurations as in the sixth to twelfth aspects.

As described above, according to the method for searching a compound, program for searching a compound, recording medium, and device for searching a compound of the present invention, it is possible to efficiently search for the structure of the compound.

BRIEF DESCRIPTION OF THE DRAWINGS

FIG. 5 is a diagram showing a chemical structural group before and after the change.

FIG. 6 is a diagram showing a calculation result of an extended fingerprint for the chemical structure before and after the change.

FIG. 7 is a diagram explaining a diversity of structures.

FIG. 8 is a diagram showing how the change in structure is adopted.

FIG. 9 is a diagram showing how the change in structure is rejected.

FIG. 10 is a diagram showing an evaluation result of the change in structure in the structural group.

FIG. 14 is a diagram showing search results according to Bayesian inference and the present invention.

FIG. 18 is a table showing results of structural search in a case where methyl yellow is included in a comparative target of the diversity.

FIG. 23 is a diagram showing a state in which the diversity of structures is reduced in the related art.

DESCRIPTION OF THE PREFERRED EMBODIMENTS

Hereinafter, embodiments of a method for searching a compound, program for searching a compound, recording medium, and device for searching a compound according to the present invention will be described with reference to the accompanying drawings.

First Embodiment

Figure 1:
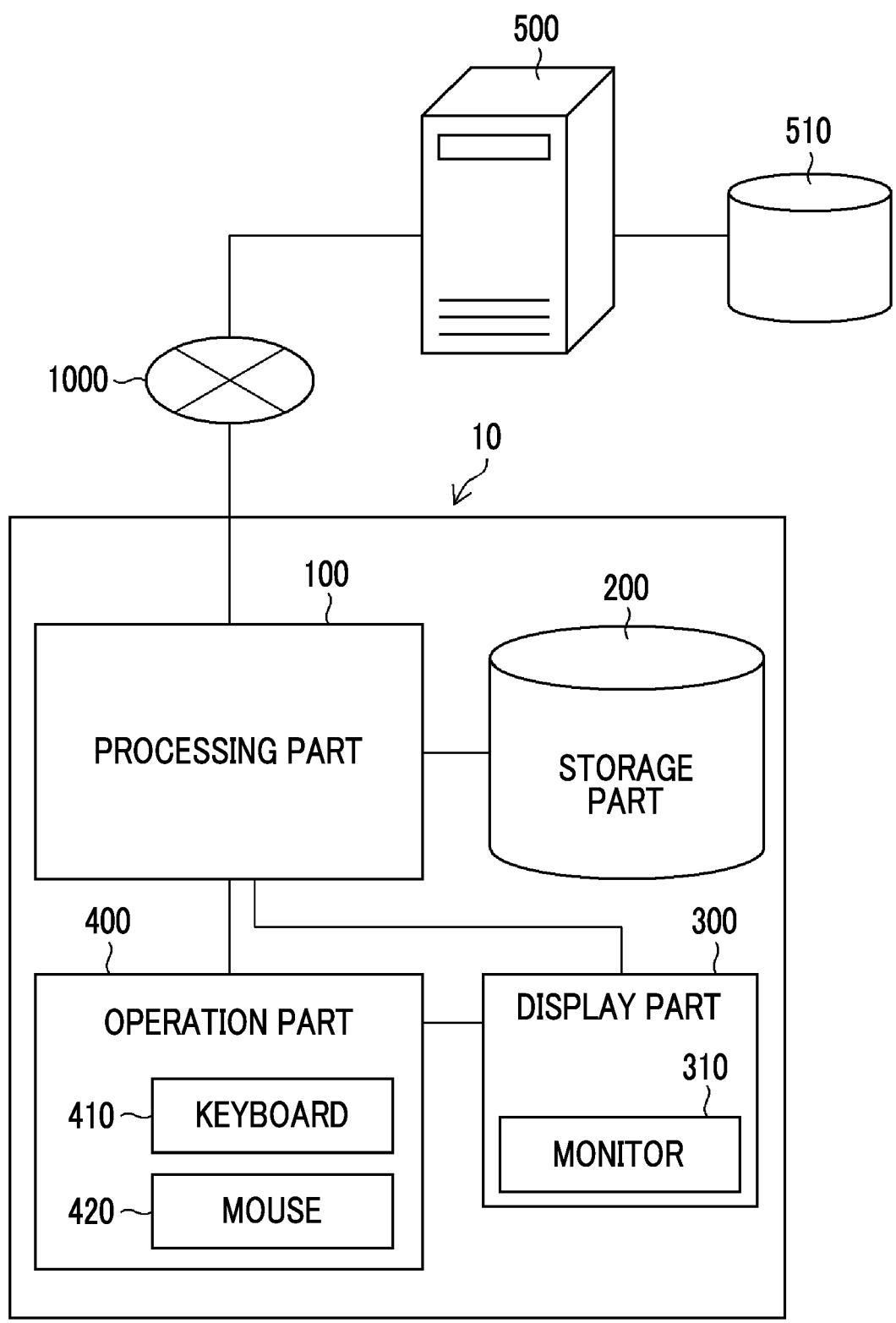
FIG. 1 is a block diagram showing a configuration of a device for searching a compound according to a first embodiment.

FIG. 1 is a block diagram showing a configuration of a device 10 for searching a compound (device for searching a compound) according to a first embodiment. As shown in FIG. 1, the device 10 for searching a compound includes a processing part 100, a storage part 200, a display part 300, and an operation part 400, which are connected to each other to transmit and receive necessary information. Various installation forms can be adopted for these constituents, and each constituent may be installed in one place (one housing, one room, and the like), or may be installed at a distant place and connected through a network. In addition, the device 10 for searching a compound is connected to an external server 500 and an external database 510 through a network 1000, and can acquire necessary information such as input data.

<Configuration of Processing Part>

Figure 2:
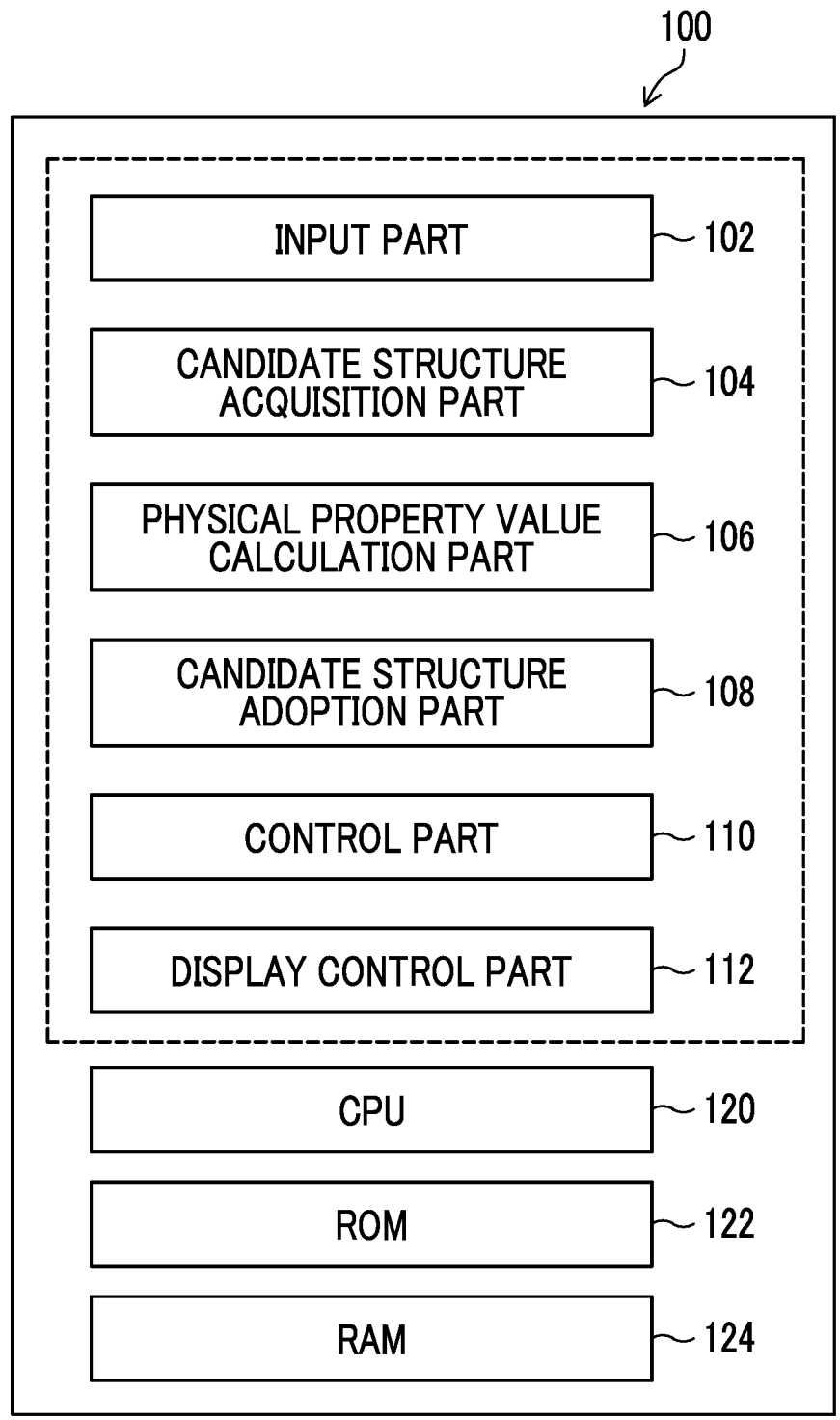
FIG. 2 is a block diagram showing a configuration of a processing part.

FIG. 2 is a diagram showing a configuration of a processing part 100. The processing part 100 includes an input part 102 (input part), a candidate structure acquisition part 104 (candidate structure acquisition part), a physical property value calculation part 106 (physical property value calculation part), a candidate structure adoption part 108 (candidate structure adoption part), a control part 110 (control part), a display control part 112 (display control part), a central processing unit (CPU) 120 (CPU), a read only memory (ROM) 122 (ROM), and a random access memory (RAM) 124 (RAM). The procedure of the method for searching a compound using each part of the processing part 100 will be described in detail later. The process in each part is performed under the control of the CPU 120.

The function of each part of the processing part 100 described above can be realized by using various processors. Examples of the various processors include a CPU that is a general-purpose processor which executes software (program) to realize various functions. In addition, examples of the various processors also include a graphics processing unit (GPU) which is a processor specializing in image process and a programmable logic device (PLD) which is a processor in which circuit configuration can be changed after manufacturing, such as a field programmable gate array (FPGA). Furthermore, examples of the various processors also include a dedicated electric circuit which is a processor having a circuit configuration specifically designed to execute a specific process, such as an application specific integrated circuit (ASIC).

The functions of each part may be realized by one processor, or may be realized by a plurality of processors of the same type or different types (for example, a plurality of FPGAs, a combination of CPU and FPGA, or a combination of CPU and GPU). In addition, a plurality of functions may be realized by one processor. As an example of configuring a plurality of functions with one processor, firstly, an aspect that, as typified by a computer such as a client and a server, one processor is configured by a combination of one or more CPUs and software, and this processor realizes the plurality of functions is exemplified. Secondly, an aspect that, as typified by a system on chip (SoC), uses a processor which realizes the functions of the entire system with a single integrated circuit (IC) chip is exemplified. As described above, various functions are composed by using one or more of the above-described various processors as a hardware structure. Furthermore, the hardware structure of these various processors is more specifically an electric circuit (circuitry) in which circuit elements such as semiconductor elements are combined. This electric circuit may be an electric circuit which realizes the above-described functions by using logical sum, logical product, logical negation, exclusive logical sum, and logical operation of a combination thereof.

In a case where the above-described processor or electric circuit executes a software (program), a processor-readable code (computer-readable code) of the software to be executed is stored in a non-temporary recording medium (recording medium) such as ROM 122 (see FIG. 2), and the processor refers to the software. The software stored in the non-temporary recording medium includes the program (program for searching a compound) for executing the method for searching a compound according to the embodiment of the present invention, and in a case where a command stored in the recording medium is read by the computer, the command causes the computer to execute the program for searching a compound. The code may be recorded in a non-temporary recording medium such as various magneto-optical recording devices and semiconductor memories instead of ROM 122. In a case of processing using a software, for example, RAM 124 is used as a temporary storage area, and for example, data stored in an electronically erasable and programmable read only memory (EEPROM) (not shown) can be referred to.

<Configuration of Storage Part>

The storage part 200 is configured of a non-temporary recording medium such as a digital versatile disk (DVD), a hard disk, and various semiconductor memories, and a control part thereof, and can store the chemical structure (initial structure and candidate structure) of the compound, a physical property value thereof, and the like.

<Configuration of Display Part and Operation Part>

The display part 300 includes a monitor 310 (display device), and can display the input image, the information stored in the storage part 200, the result of process by the processing part 100, and the like. The operation part 400 includes a keyboard 410 and a mouse 420 as input devices and/or pointing devices, and the user can perform operations necessary for executing the method for searching a compound according to the embodiment of the present invention through these devices and a screen of the monitor 310. For example, the user can perform designation of process start instruction, target value of physical property value, parameters used for the first function and the second function, and number of repetitions.

<Procedure of Method for Searching Compound>

Figure 3:
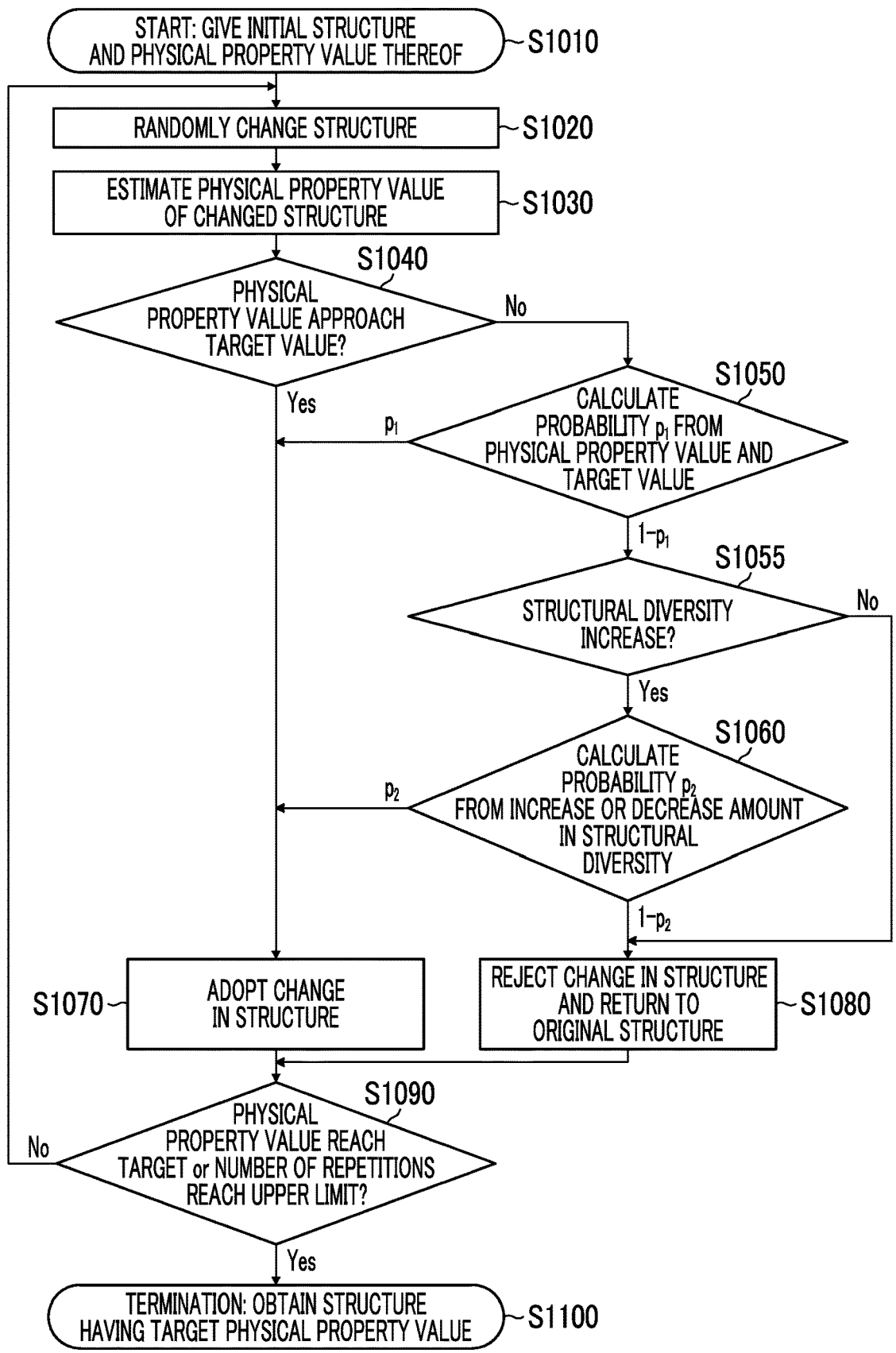
FIG. 3 is a flowchart showing a procedure of a method for searching a compound.

FIG. 3 is a flowchart showing a procedure of the method for searching a compound according to the embodiment of the present invention.

<Data Input>

The input part 102 inputs a chemical structure (initial structure) of one or more compounds, one or more physical property values according to the chemical structure (initial structure), and a target value of the physical property values (Step S1010: input step). Data stored in the storage part 200 may be used as these data, or these data may be acquired from the external server 500 and the external database 510 through the network 1000. What kind of data may be input may be decided according to the user's instruction input through the operation part 400. The initial structure may be one or a plurality. In addition, the physical property value may also be one or a plurality. As a method for giving physical property values, a method with high throughput, such as quantum chemistry calculation, molecular dynamics calculation, and machine learning result, is desirable. On the other hand, in a case where there is no practical problem in the throughput of compound synthesis or physical property measurement, it is possible to use the measured value.

<Acquisition of Candidate Structure>

The candidate structure acquisition part 104 randomly changes the chemical structure to acquire a candidate structure (Step S1020: candidate structure acquisition step). In this case, any method which can change the chemical structure may be used. For example, a method in which an atom or an atomic group is added to or deleted from the chemical structure to generate an objective structure, and the objective structure is defined as the candidate structure can be used. Specifically, this method is a method for generating a compound structure, which includes (A) a step of preparing a standard compound database for evaluating synthetic aptitude and a compound structure (chemical structure), (B) a step of choosing to add an atom or an atomic group to the compound structure or to delete an atom from the compound structure, (C) a step of, in a case of choosing to add an atom to the compound structure, bonding a new atom to an atom selected from atoms included in the compound structure, or in a case of choosing to delete an atom from the compound structure, deleting selected atom from the atoms included in the compound structure, thereby obtaining a modified compound structure, (D) a step of determining a synthetic aptitude of the modified compound structure based on information of the compound database, (E) a step of, in a case where the modified compound structure has the synthetic aptitude, probabilistically accepting the modification, or in a case where the modified compound structure does not have the synthetic aptitude, probabilistically rejecting the modification, and (F) a step of repeating the steps (B) to (E) until the compound structure which has undergone the step (E) satisfies a termination condition. The generated candidate structure may be displayed on the monitor 310 (display device) by the display control part 112. In addition, in a case of returning to the step S1020 from the step S1090 described later, it is also possible to add one or more structures among structures generated last time, in which physical property values are close to the target value, to the compound database (structural group) for evaluating the synthetic aptitude, and in the step S1020, gradually generate a structure having a physical property value close to the target value.

<Evaluation of Physical Property Value>

The physical property value calculation part 106 calculates a physical property value of the candidate structure (structure changed in the step S1020) (Step S1030: physical property value calculation step). For the calculation of the physical property value, it is preferable to use the same method as a case of estimating the physical property value of the initial structure.

<First Adoption Process>

The candidate structure adoption part 108 determines whether or not the physical property value approaches the target value (Step S1040: candidate structure adoption step). Specifically, in a case where a physical property value before the change in structure is defined as f0, a physical property value after the change in structure is defined as f1, and the target value of the physical property value is defined as F, in a case where |F−f1|≤|F−f0| is satisfied (a case where the absolute value of the difference (first difference) between the physical property value of the candidate structure and the target value of the physical property value is equal to or less than the absolute value of the difference (second difference) between the physical property value of the chemical structure and the target value of the physical property value), since the physical property value approaches (does not move away from) the target value, the process proceeds to a step S1070 to adopt the change in structure (first adoption process). On the other hand, in a case where |F−f1|>|F−f0| is satisfied (a case where the absolute value of the difference (first difference) between the physical property value of the candidate structure and the target value of the physical property value is more than the absolute value of the difference (second difference) between the physical property value of the chemical structure and the target value of the physical property value), the process proceeds to a step S1050.

In the step S1050 (candidate structure adoption step), the candidate structure adoption part 108 calculates a first adoption probability from a first function based on the difference between the physical property value of the candidate structure and the target value of the physical property value (first adoption process). Specifically, the candidate structure adoption part 108 gives a monotonically decreasing function P1(d) in which d=|F−f1|−|F−f0|, and estimates a probability p1=P1(d). The monotonically decreasing function P1(d) corresponds to the "first function" (monotonically decreasing function with respect to the difference between the absolute value of the difference between the physical property value of the candidate structure and the target value of the physical property value, and the absolute value of the difference between the physical property value of the chemical structure and the target value of the physical property value) in the present invention, and the probability p1 corresponds to the "first adoption probability" in the present invention.

Various functions can be used as the monotonically decreasing function P1(d), and for example, a function represented by Expression (1) can be used. 6 is a hyperparameter, and the degree of monotonous decrease can be adjusted by changing the value of 6. The value of parameter may be changed by inputting the user's instruction through the operation part 400.

$$P_1(d) = \exp[-d/\sigma] \quad (1)$$

In a case of n objective (where the number of physical property values input in the step S1010 is n), defining i as an index representing each objective, for example, functions represented by Expressions (2) and (3) can be used.

$$w_i = \exp[-d_i/\sigma_i] \quad (2)$$

$$P_1(\{d_i\}) = \begin{cases} 1 & (\exists\, i \text{ s.t. } w_i > 1) \\ \prod_{i=1}^{n} w_i & (\text{otherwise}) \end{cases} \quad (3)$$

The functions represented by Expressions (2) and (3) are based on the criterion that "in a case where there is even one physical property value which approaches the target, adopting the change in structure", but various other functions can be used. In addition, more simply, in a case of considering the physical property value of the n object as n-dimensional vectors ff and FF, it is also possible to estimate d=|FF−ff1|−|FF−ff0| from Euclidean distance |FF−ff| so that the case is solved as a single-object problem (it is assumed that ff, ff0, ff1, and FF are vectors). In a case of adopting this policy, it is desirable to calculate the average and variance of each physical property value from the existing data, perform standardization, and then calculate the distance.

After obtaining the probability p1, the candidate structure adoption part 108 uses an appropriately generated random number to proceed to the step S1070 with the probability p1, adopt the change in structure, and proceed to a step S1055 with a probability (1−p1). That is, in the step S1050, the candidate structure adoption part 108 adopts the candidate structure with the first adoption probability (first adoption process). The reason why the probabilistic process is performed in this way (even in a case where the physical property value moves away from the target value, the change in structure is adopted with the probability p1) is to prevent a drop to a local minimum. The local minimum means "state in which the physical property value moves away from the target value no matter how the structure is changed", and in order to escape from the local minimum and reach a global minimum, it is necessary to undergo a change in structure in which the physical property value moves away from the target value. By the above-described probabilistic process, such a path can be secured.

<Second Adoption Process>

In a case where the candidate structure is not adopted as a result of the first adoption process in the step S1050 (possible with the probability (1−p1)), the candidate structure adoption part 108 performs a second adoption process to determine whether to or not to adopt the candidate structure based on "whether or not a structural diversity of a structural group composed of the chemical structure and the candidate structure increases due to the change in chemical structure" (Steps S1055, S1060, and S1070). The second adoption process will be described below. The index representing the structure is defined as j, and the structural group is represented by S={sj}. A function which gives the structural diversity of a structural group S is expressed as V(S). It is assumed that V(S) takes a larger value as the structural diversity increases.

<Evaluation Method of Structural Diversity (1)>

In a case of giving N (>1) initial structures, it is assumed that the change in structure of kth chemical structure among the N chemical structures is adopted or rejected. In mth trial, from a structural group Sm−1={s(m−1)j} before a change in structure (m-lth) and a structural group Sm={smj} after the change (mth), a structural group Sk={s(m−1)0, s(m−1)1, ..., smk, ..., s(m−1)N} after the change in structure of the kth chemical structure is defined, and dv=V(Sk)−V(Sm−1) is estimated. dv indicates an increase or decrease amount in the structural diversity due to changes in structure. In a case where dv>0 (a case where the diversity is improved by the kth change in structure; Yes in the step S1055), a monotonically increasing function P2(dv) with respect to dv (increase or decrease amount in the structural diversity) is given, and a probability p2=P2(dv) is calculated (Step S1060: second adoption process). Then, using an appropriately generated random number, the process proceeds to the step S1070 (adopting the change in structure; second adoption process) with the probability p2, and proceeds to a step S1080 (rejecting the change in structure and returning to the original structure; rejection process) with a probability (1−p2). The monotonically increasing function P2(dv) corresponds to the "second function" in the present invention, and the probability p2 corresponds to the "second adoption probability" in the present invention.

The reason why the above-described probabilistic process (calculating the candidate structure with the probability p2 calculated by the monotonically increasing function P2(dv)) is performed in a case where the structural diversity increases is that, in a case of setting to "always adopt the change in structure in a case where the structural diversity increases", the change in structure is adopted too frequently even though the physical property value moves away from the target value, and as a result, the convergence of the physical property value to the target value may be delayed. By performing the above-described probabilistic process, the convergence of the physical property value can be accelerated and the structure of the compound can be efficiently searched.

In a case where dv<0 calculated in the step S1060 (a case where the diversity decreases; No in the step S1055), the process proceeds to the step S1080 (rejecting the change in structure and returning to the original structure; rejection process).

<Evaluation Method of Structural Diversity (2)>

Instead of the above-described "evaluation method of structural diversity (1)", the probability p2 may be calculated (Step S1060: second adoption process) by the monotonically increasing function P2(dv) assuming that, in a case where an index representing the trial is defined as t, a structural group Sprev={St-1, St-2, . . . , St-m} (here, S0 shown in a case where t=m is defined as the initial structure) obtained in the past m trials and a structural group Scurr={st, St-1, . . . , St-(m-1)} to which a structure st that is considered to be adopted or rejected is added are defined, and dv=V(Scurr)−V(Sprev) is calculated. That is, the structural group Sprev is a structural group (first structural group) composed of the initial structure and chemical structures after at least one change, and the structural group Scurr is a structural group (second structural group) in which the candidate structure is added to the first structural group. Sprev (first structural group) may include the initial structure and at least a part of structural groups after at least one change. In addition, V(Sprev) and V(Scurr) are respectively the structural diversity of the structural groups Sprev and Scurr, and dv indicates an increase or decrease amount in the structural diversity due to changes in structure. In addition, in addition to the case where all the initial structure and structural groups obtained in past trials are used, structures of the higher performance (ranking is higher as the physical property value is closer to the target value) or the lower performance (ranking is lower as the physical property value is farther from the target value) may be extracted and used as Sprev, or compounds from existing library (compounds of known structures) may be mixed with Sprev. By selecting Sprev in this way, it is possible to flexibly set the evaluation standard for structural diversity.

In the "evaluation method of structural diversity (2)", it is easy to select a candidate structure different from the chemical structure included in Sprev which is the evaluation standard for diversity. For example, in a case where the compounds from existing library (compounds of known structures) are included in Sprev, a candidate structure with low structural similarity to the "compounds from existing library" (having a different structure from known compounds) can be easily selected. In addition, in a case where the structures with higher performance (having physical property values close to the target value) are extracted and used as Sprev, it is easy to select "a structure with higher performance, which has a structural feature different from the structure with higher performance already covered". Therefore, this condition can be specified in a case where it is desired to acquire as many structures with higher performance as possible. In addition, even in a case where existing library compounds with higher performance are difficult to use for some reason (easy to decompose, toxic, and the like), these can be added to Sprev to perform the structural search. On the other hand, in a case where the structures with lower performance are extracted and used as Sprev, it is easy to select "a structure with higher performance, which has a structural feature different from the structure with lower performance already covered". The diversity of the structural group of structures with higher performance, obtained by this search, may be lower than that of a case where the structures with higher performance are extracted, but since the search proceeds so as to avoid the structure with lower performance, it is considered that the search itself can be accelerated. As described above, the structure finally obtained may differ depending on how Sprev is selected.

<Function which Gives Structural Diversity of Structural Group>

As the above-described "function which gives the structural diversity of the structural group", for example, the following definition can be considered based on Tanimoto coefficient (one of indexes showing similarity of compounds) (various other definitions are possible). Specifically, in a case where a structure s as a fingerprint (the compound is converted into a fixed-length vector according to a certain rule, and various production methods are known) of a bit stream (sequence of 0 or 1) is defined as Fs, the definition of the Tanimoto coefficient is represented by Expression (4).

$$T_{s,s'} = T(F_s, F_{s'}) = \frac{|F_s \cap F_{s'}|}{|F_s| + |F_{s'}| - |F_s \cap F_{s'}|} \quad (4)$$

Here, |Fs| is the number of bits of 1 in Fs, and |Fs∩Fs'| is the number of bits of 1 in common between Fs and Fs'. Ts,s' is 1 in a case where Fs and Fs' are completely matched, and is 0 in a case where Fs and Fs' are not completely matched. Therefore, Ts,s' is an index showing the similarity between the structure s and the structure s'. Since it is the dissimilarity to be obtained, the dissimilarity vs,s' between the structure s and the structure's is defined by Expression (5).

$$v_{s,s'} = 1 - T_{s,s'} \quad (5)$$

Using this dissimilarity vs,s', the dissimilarity of the structural group S (that is, the structural diversity of the structural group) can be defined by Expression (6).

$$V(S) = \frac{2}{N(N-1)} \sum_{s \in S, s' \in S, s \neq s'} v_{s,s'}^2 \quad (6)$$

V(S) takes a value from 0 to 1, and the structural diversity of the structural group is higher as the value is larger.

In addition, as the monotonically increasing function P2(dv) with respect to the increase or decrease amount dv of the structural diversity, a function represented by Expression (7) can be used. σv and Cv are hyperparameters, and the degree of monotonous increase can be adjusted by changing the values thereof. The values of these parameters may be changed by inputting the user's instruction through the operation part 400.

$$P_2(d_v) = C_v(1 - \exp[-d_v/\sigma_v]) \quad (7)$$

Obviously from the functional form, P2 is Cv at the limit of dv→∞. Therefore, Cv means "probability in which the change in structure is adopted in a case of the change in structure that the diversity is sufficiently improved".

<Repetition of Process>

One trial terminates in a case where the above-described first adoption process, second adoption process, and rejection process are performed for each of the given initial structures, and the above-described processes terminate for all chemical structures.

In a case where the candidate structure is adopted or rejected as a result of the above-described first adoption process, second adoption process, and rejection process, the control part 110 determines whether or not the termination condition is satisfied (Step S1090: control step). For example, in a case where the number of times changing the chemical structure (the number of trials) reaches a specified number of times, and/or a case where the physical property value of the candidate structure reaches the target value, it can be determined that "the termination condition is satisfied". In a case of calculating a plurality of chemical structures and/or physical property values, it may be determined that "in a case where there is even one chemical structure and/or physical property value which has reached the target value, the calculation is terminated", or may be determined to "repeat trials until all structure and/or physical property values reach the target". The control part 110 repeats the processes (input step, candidate structure acquisition step, physical property value calculation step, and candidate structure adoption step) from the step S1020 to the step S1080 unit the termination condition is satisfied (No in the step S1090), and terminates the process of the method for searching a compound in a case where the termination condition is satisfied (Yes in the step S1090) (Step S1100).

<Effect of First Embodiment>

As described above, according to the device 10 for searching a compound according to the first embodiment, a method for searching a compound, recording medium, and a program for searching a compound, since the escape from the local minimum can be promoted and the convergence of the physical property value can be accelerated, the structure of the compound having a desired physical property value can be efficiently searched.

<Examples: Search for Coloring Agent>

The present invention will be specifically described with reference to the example. Even in this example, the search can be performed by the device 10 for searching a compound (device for searching a compound) shown in FIGS. 1 and 2 and the flowchart (method for searching a compound and process of the program for searching a compound) shown in FIG. 3.

<Input Step>

Figure 4A:
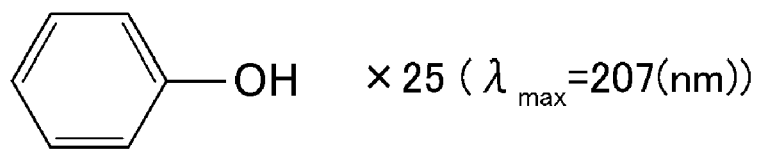
FIGS. 4A to 4D are diagrams showing changes in chemical structure in the examples.

In the example, as shown in FIG. 4A, 25 phenols are given as an initial structure. Considering λmax (maximum absorption wavelength) as a physical property value, a target value is set to 367 nm. The structure was optimized with PM6 level, and then λmax is calculated with ZINDO. A quantum chemistry calculation software "Gaussian16" is used for the calculation. These processes correspond to the step S1010 (input step) in the flowchart of FIG. 3.

<Candidate Structure Acquisition Step>

Figure 4B:
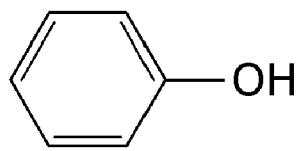
Figure 4C:
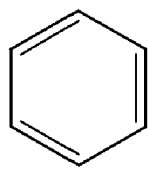

The above-described initial structure is randomly changed (Step S1020: candidate structure acquisition step). As a method of change in structure, a method in which an atom or an atomic group is added to or deleted from the chemical structure to generate an objective structure, and the objective structure is defined as the candidate structure can be used as in the first embodiment. For example, it is assumed that the first structure changes from FIG. 4B to FIG. 4C.

<Physical Property Value Calculation Step>

Figure 4D:
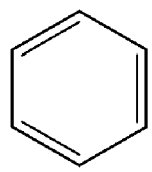

In this case, as shown in FIG. 4D, the result of estimating the physical property value of the changed structure is assumed that λmax=200 (nm) (Step S1030: physical property value calculation step).

<Candidate Structure Adoption Step: First Adoption Process>

It is determined whether or not the physical property value approaches the target value (Step S1040: first adoption process). Since, from |F−f1|=|367−200|=167 (nm) and |F−f0|=|367−207|=160 (nm), |F−f1|>|F−f0| (the absolute value of the first difference is more than the absolute value of the second difference and the physical property value moves away from the target value), the determination in the step S1040 is denied and the process proceeds to the step S1050 (calculation of the probability p1). From the physical property value and the target value, the probability p1 (first probability) is calculated by the above-described first function (monotonically decreasing function P1(d) with respect to a third difference d). Here, the probability p1 is calculated by Expression (8) with σ=10 (nm).

$$p_1 = P_1(d) = P_1(167 - 160) \quad (8)$$
$$= \exp\left[-\frac{7}{10}\right] \cong 0.50$$

Therefore, the possibility of adopting the first change in structure is almost 50%. However, it is assumed that a result of evaluation by generating a random number is "not adopt the change in structure". In this case, the process proceeds to the step S1060 (calculation of the probability p2; second adoption process).

<Candidate Structure Adoption Step: Second Adoption Process>

In the step S1060, the increase or decrease amount in the structural diversity is calculated, and the probability p2 (second adoption probability) is calculated by the above-described second function. As shown in FIG. 5, the initial structural group is defined as S0, and the structural group considering the first change in structure is defined as S1.

First, fingerprint is calculated. Here, the extended fingerprint is estimated using a library rcdk of R (open source programming language and development environment thereof). The length of the bit stream is 1024. The results are shown in FIG. 6. The numbers in the figures are bit numbers in which the value is 1. Therefore, in a case where the structure s before the change and the structure s' after the change are as shown in FIG. 7, the Tanimoto coefficient and the dissimilarity of the structures are obtained by Expressions (9), (10), and (11).

$$|F_s| = 15, |F_{s'}| = 8 \quad (9)$$
$$|F_s \cap F_s| = 15, |F_{s'} \cap F_{s'}| = 8, |F_s \cap F_{s'}| = 8$$

$$T_{s,s} = 1, T_{s',s'} = 1, T_{s,s'} = \frac{8}{15+8-8} \cong 0.53 \quad (10)$$

$$v_{s,s} = 0, v_{s',s'} = 0, v_{s,s'} = 1 - T_{s,s'} \cong 0.47 \quad (11)$$

Therefore, the dissimilarity of the structural group is obtained by Expression (12).

$$V(S_0) = 0 \quad (12)$$

$$V(S_1) = \frac{2}{25(25-1)} \sum_{j=2}^{25} v_{s_{11},s_{1j}}^2 = \frac{1}{300} \times 0.47^2 \times 24$$

$$\cong 0.017$$

Therefore, in a case of obtaining the increase or decrease amount dv in the structural diversity (structural diversity is evaluated by the above-described "evaluation method of structural diversity (1)"), the increase or decrease amount dv=V(S1)–V(S0)≈0.017>0. That is, since the diversity is improved by the change in structure, the process proceeds to the calculation of the probability p2 (second adoption probability) (Step S1060: second adoption process). Assuming that σv=0.01 and Cv=0.5 in Expression (7), the probability p2 can be calculated as in Expression (13).

$$p_2 = P_2(d_v) = 0.5 \times (1 - \exp(-0.017/0.01]) \quad (13)$$

$$\cong 0.41$$

In a case where the change in structure is adopted as a result of evaluation by generating a random number in the step S1060, the process proceeds to the step S1070. Then, the first change in structure is formally adopted and benzene is registered as a new structure (refer to FIG. 8). The same process is performed for the other 24 structures.

On the other hand, in a case where the change in structure is not adopted in the step S1060, the process proceeds to the step S1080, and as shown in FIG. 9, the structure is returned to the structure before the change in structure (rejecting the change in structure; rejection process).

Figure 11:
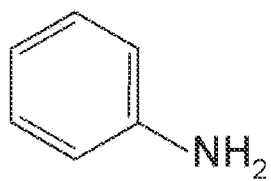
FIG. 11 is a diagram showing a chemical structure having a physical property value closest to a target value.

It is assumed that the structural group shown in FIG. 10 is obtained as a result of evaluating all 25 structures. The reason why the phenol of the initial structure remains as it is in the structural group of FIG. 10 is that the change in structure is rejected in the step S1060 (adopting the change in structure with the probability p2) and the process proceeds to the step S1080. Even in a structure among the structures shown in FIG. 10, which has a physical property value closest to the target value, λmax=208 (nm) (refers to FIG. 11), which does not reach the target value of 367 nm. Therefore, the determination in the step S1090 is denied, and the process returns to the step S1020 (control step).

Figure 12:
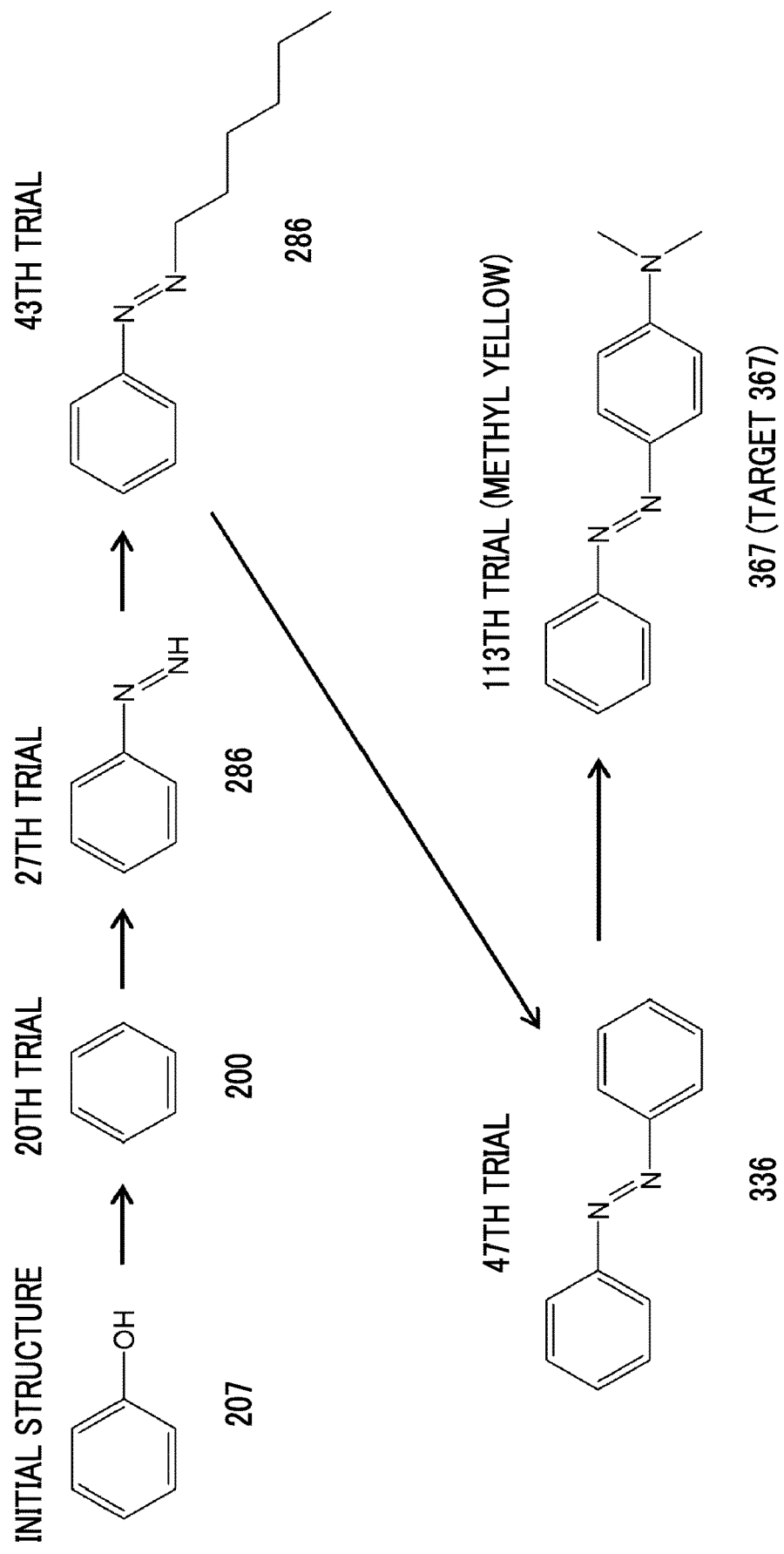
FIG. 12 is a diagram showing how the chemical structure changes as the process is repeated.
Figure 13A:
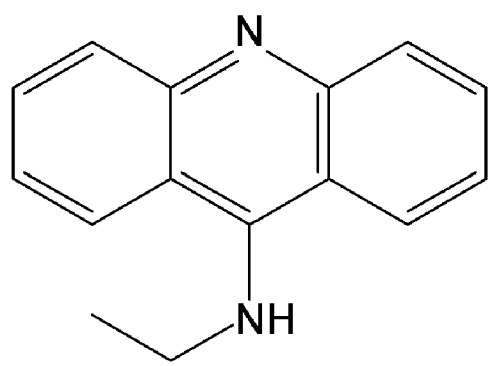
FIGS. 13A and 13B are diagrams showing other chemical structures having the target physical property value.
Figure 13B:
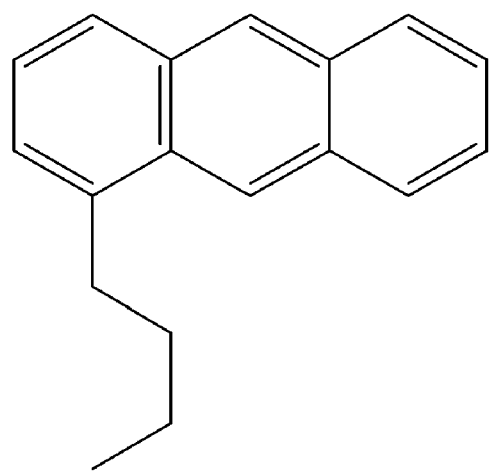

FIG. 12 shows how the structure and λmax change in a case of repeating the above-described process. In the structure appearing in the 113th trial, λmax matches the target, and it is confirmed that a compound having a target physical property can be acquired by solving the inverse problem in the present invention. The structure appearing in the 113th trial is a real compound called methyl yellow. Since the physical property value has reached the target, the process may be terminated here, but it is assumed that the search is continued here. Then, in a case where the upper limit of the number of trials is set to 500, the process is terminated in a case where the number of trials reaches the upper limit of 500 (that is, where the termination condition is satisfied here) (in a case of Yes in the step S1090, the process proceeds to the step S1100; control step). By 500 trials, in addition to the above-described methyl yellow, many compound structures expected to have the desired λmax can be acquired (for example, structures shown FIGS. 13A and 13B).

<Comparison with Other Methods>

Bayesian inference is usually used as another method. Here, the results calculated using a particulate filter which is a type of Bayesian inference are compared with the results obtained in the present invention. The search for a compound having λmax=367 (nm) is performed using a particulate filter under the same λmax calculation condition as in the above-described example. The λmax of top 50 compounds among the compounds obtained up to 500th trial is shown together with the results of the present invention (refer to FIG. 14). In the Bayesian inference, only a few compounds having λmax equivalent to the target value is obtained, but in the present invention, all the top 50 compounds have λmax equivalent to the target value. Therefore, it can be said that "the present invention is able to search the structure more efficiently than the Bayesian inference".

Figure 15A:
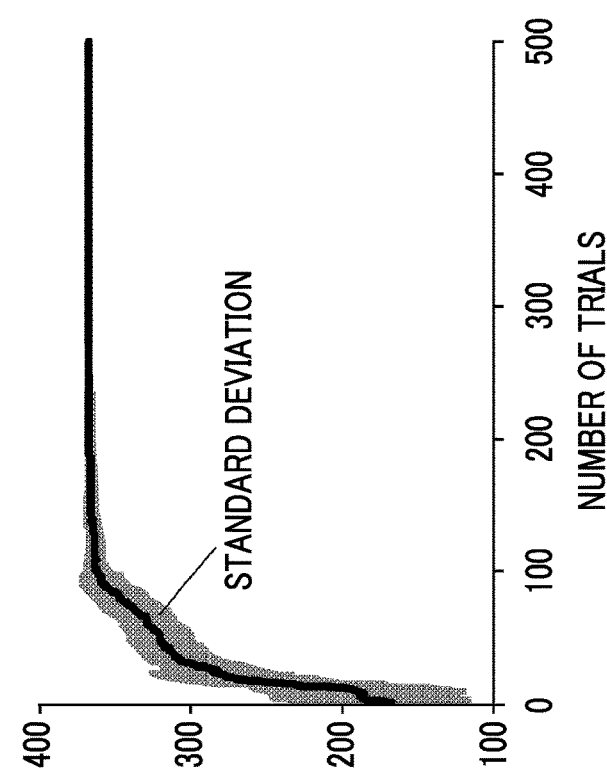
FIGS. 15A and 15B are diagrams showing how 2\,max changes according to Bayesian inference and the present invention.
Figure 15B:
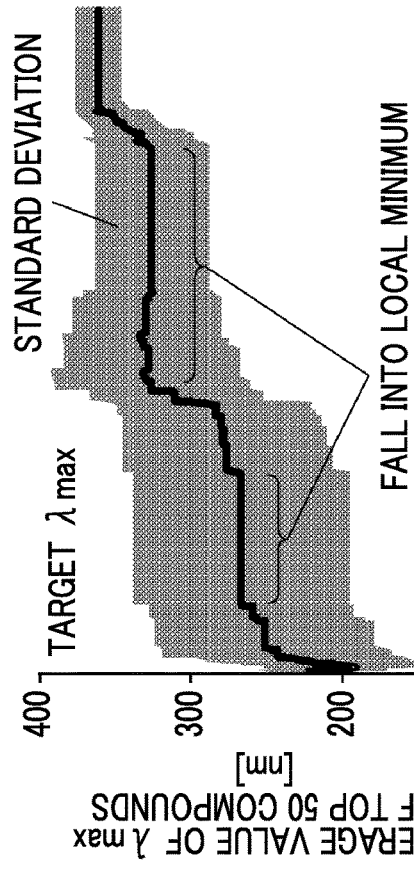
Figure 16:
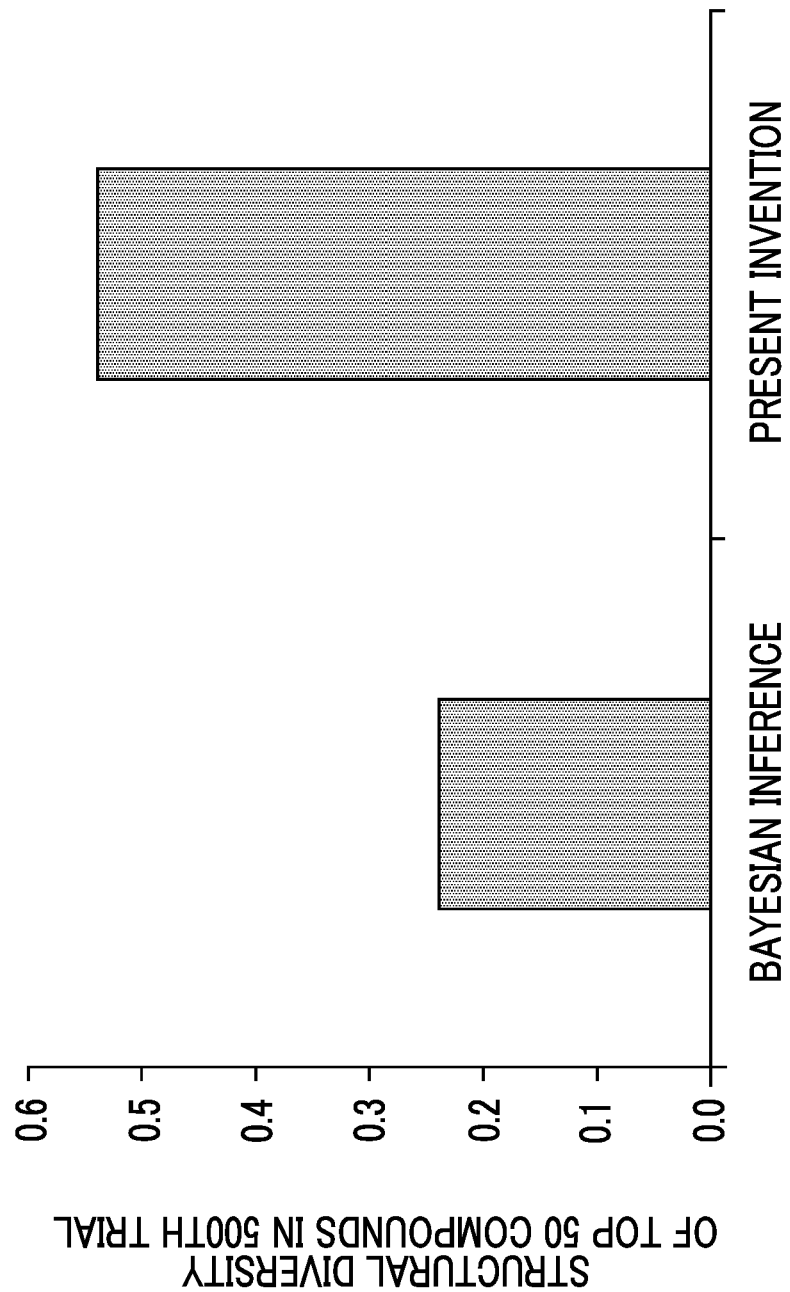
FIG. 16 is a diagram showing a structural diversity according to Bayesian inference and the present invention.

In order to clarify the reason for the low search efficiency in the Bayesian inference, the average value of λmax of the top 50 compounds with respect to the number of trials was plotted (refer to FIGS. 15A and 15B). As a result, it is found that, in the Bayesian inference, the search falls into the local minimum twice. On the other hand, in the present invention, the search can be performed smoothly without falling into the local minimum. Furthermore, as a result of examining the structural diversity (value of V(S) described above) of the top 50 compounds in the 500th trial, the diversity of the present invention is larger than that of the Bayesian inference (refer to FIG. 16). This means that "a group which is structurally more diverse while having the same physical property value as the target value is acquired".

As described above, according to the present invention, the search efficiency is significantly improved compared to the Bayesian inference method commonly used. In addition, the structural diversity of the obtained compound also increases.

<Relationship Between Evaluation Method of Structural Diversity and Efficiency of Structural Search>

Figure 17:
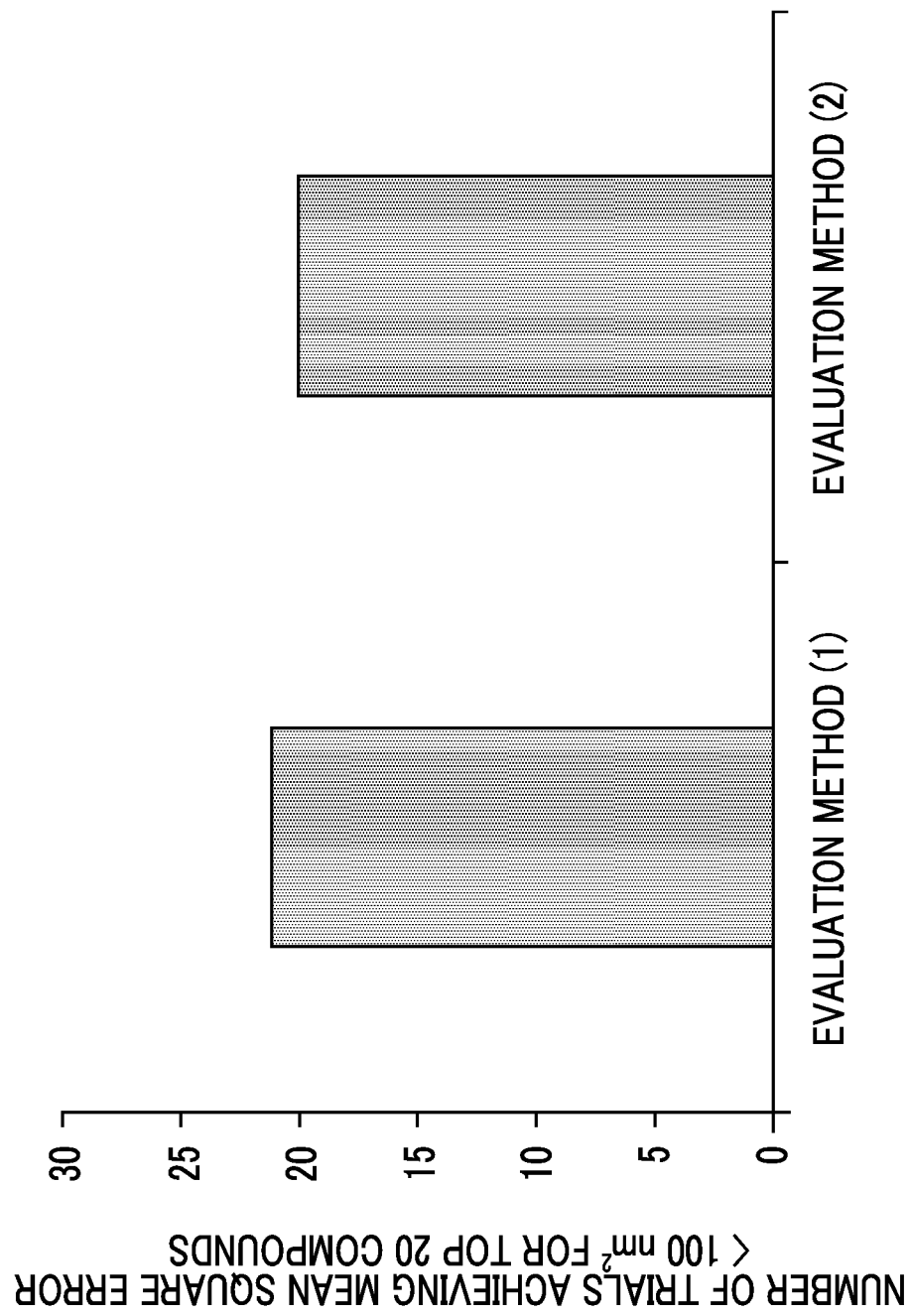
FIG. 17 is a diagram showing the number of trials required to achieve a target for two diversity evaluation methods.

In the above-described example, the structural diversity is evaluated by the "evaluation method of structural diversity (1)", but the structural search can be performed with the same efficiency in a case of using the "evaluation method of structural diversity (2)". Specifically, as a result of calculating a mean square error with the target λmax (367 nm) of top 20 compounds (1st, 2nd, . . . in order of physical property value closer to the target value) in each trial, as shown in FIG. 17, in either case of the "evaluation method of structural diversity (1)" and the "evaluation method of structural diversity (2)", "mean square error<100 (nm²)" can be achieved after approximately 20 trials. In the "evaluation method of structural diversity (2)", Sprev is set to "top 100 structures having physical property values close to the target value, among structures generated in the past trials".

Other Examples

FIG. 18 shows structural search results in a case of including methyl yellow (one example of the above-described "compounds from existing library") in a comparative target of the diversity. As a result of the structural search, methyl yellow is not generated, and many candidate compounds having low similarity to methyl yellow (having small Tanimoto coefficient) can be obtained. The numerical values in FIG. 18 are values in the 500th trial. In addition, as described above, the Tanimoto coefficient is one of indexes showing similarity of structures of compounds, and takes a value of 0 to 1 (similarity is higher as the value is closer to 1).

Second Embodiment

Next, a second embodiment of the present invention will be described. In the above-described first embodiment, the first adoption process is performed first, and in a case where the candidate structure is not adopted by the first adoption process, the second adoption process is performed. However, in the second embodiment, the second adoption process is first performed contrary to the first embodiment, and in a case where the candidate structure is not adopted by the second adoption process, the first adoption process is performed.

In the second embodiment, the configuration of the device for searching a compound 10 (device for searching a compound) can adopt the configuration shown in FIGS. 1 and 2 as in the first embodiment.

Figure 19:
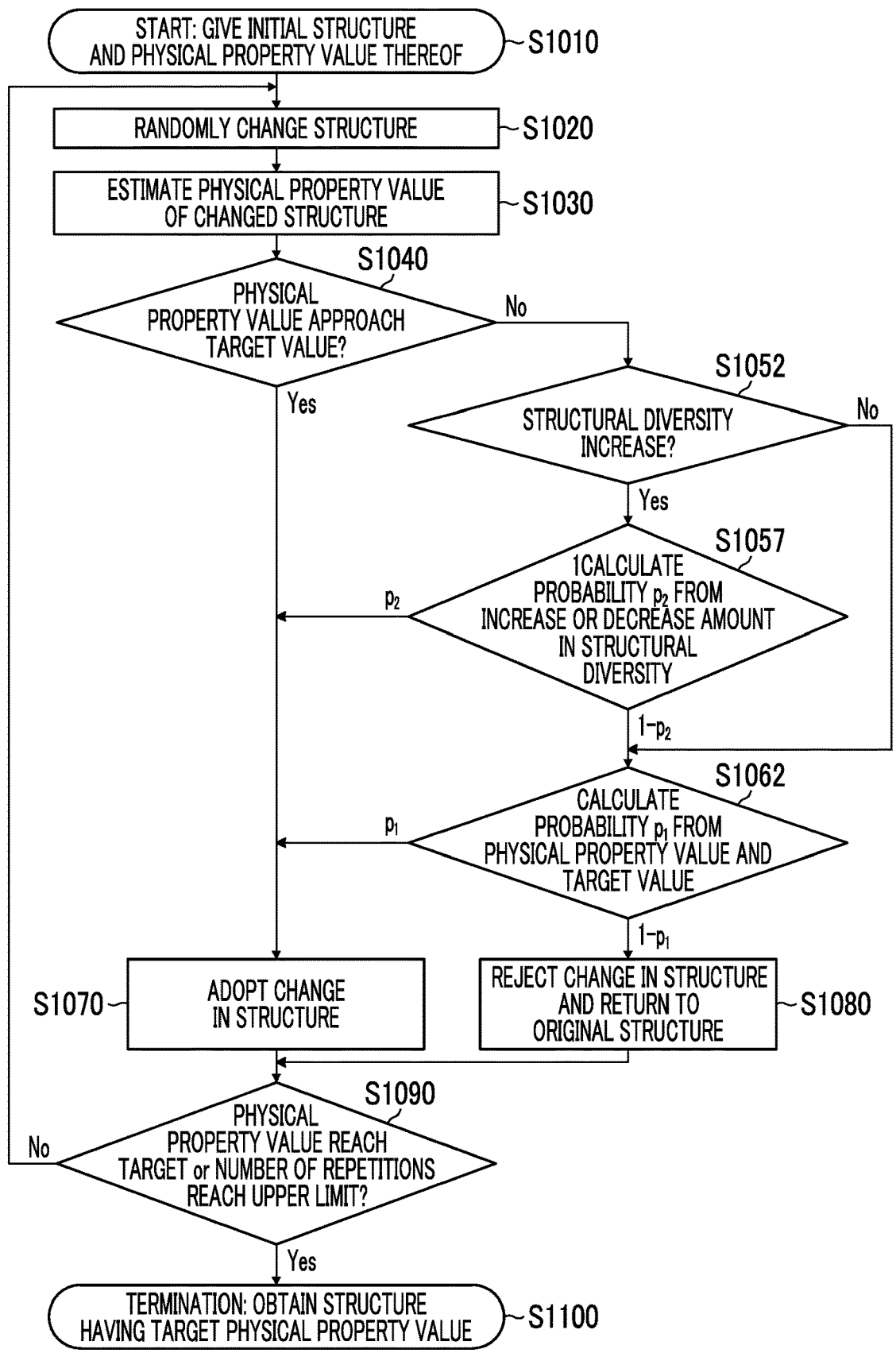
FIG. 19 is a flowchart showing a procedure of a method for searching a compound according to a second embodiment.

FIG. 19 is a flowchart showing a process of the method for searching a compound and program for searching a compound according to the second embodiment. In FIG. 19, the same step number is assigned to a step which performs the same process as in FIG. 3, and detailed description thereof will be omitted. In addition, a non-temporary and computer-readable recording medium, which causes a computer to execute the program according to the flowchart of FIG. 19 in a case where a command stored in the recording medium is read by the computer, is also an aspect of the second embodiment.

In a case where the candidate structure adoption part 108 (candidate structure adoption part) determines No (the physical property value does not approach the target value) in the step S1040, the process proceeds to a step S1052. The detail of the step S1052 (second adoption process) is the same as that of the step S1055 in FIG. 3, and the candidate structure adoption part 108 can evaluate the structural diversity by the above-described "evaluation method of structural diversity (1)" or the above-described "evaluation method of structural diversity (2)".

In a case where the determination is affirmed in the step S1052, the process proceeds to a step S1057, and the candidate structure adoption part 108 calculates the probability p2 (second adoption probability) by the monotonically increasing function P2(dv) in the same manner as in the step S1060 of FIG. 3 (second adoption process). After obtaining the probability p2, the candidate structure adoption part 108 uses an appropriately generated random number to adopt the change in structure with the probability p2 (Step S1070: second adoption process). In a case where the change in structure is not adopted in the step S1057, the process proceeds to a step S1062.

In the step S1062, the candidate structure adoption part 108 calculates the probability p1 (first adoption probability) from the physical property value and the target value in the same manner as in the step S1050 (first adoption process), and uses an appropriately generated random number to adopt the change in structure with the probability p1 (Step S1070: first adoption process). In a case where the change in structure is rejected, the process proceeds to the step S1080, and the candidate structure adoption part 108 rejects the change in structure and returns to the original structure (rejection process). In the step S1052, even in a case where the determination is denied (a case where the structural diversity does not increase), rather than immediately rejecting the change in structure, the candidate structure adoption part 108 leaves room for adoption based on the physical property value and the target value (proceeding to the step S1062).

Even in the case of the second embodiment described above, as the first embodiment, it is possible to efficiently search for the structure of the compound having a desired physical property value.

The adoption probability according to the flowchart of FIG. 19 is equivalent to that of FIG. 3. The adoption probability of the change in structure, in a case of being evaluated in the order of "physical property→structural diversity" as shown in FIG. 3, is "p1+(1−p1)×p2=p1+p2−p1×p2", but the adoption probability of the change in structure, in a case of being evaluated in an order of "structural diversity→physical property" as shown in FIG. 19, is "p2+(1−p2)×p1=p1+p2−p1×p2".

Third Embodiment

Next, a third embodiment of the present invention will be described. In the above-described first and second embodiments, in a case where one of the first and second adoption processes is performed and the candidate structure is not adopted, the other adoption process is performed, but in the third embodiment, the first and second adoption processes are performed simultaneously.

In the third embodiment, the configuration of the device for searching a compound 10 (device for searching a compound) can adopt the configuration shown in FIGS. 1 and 2 as in the first embodiment.

Figure 20:
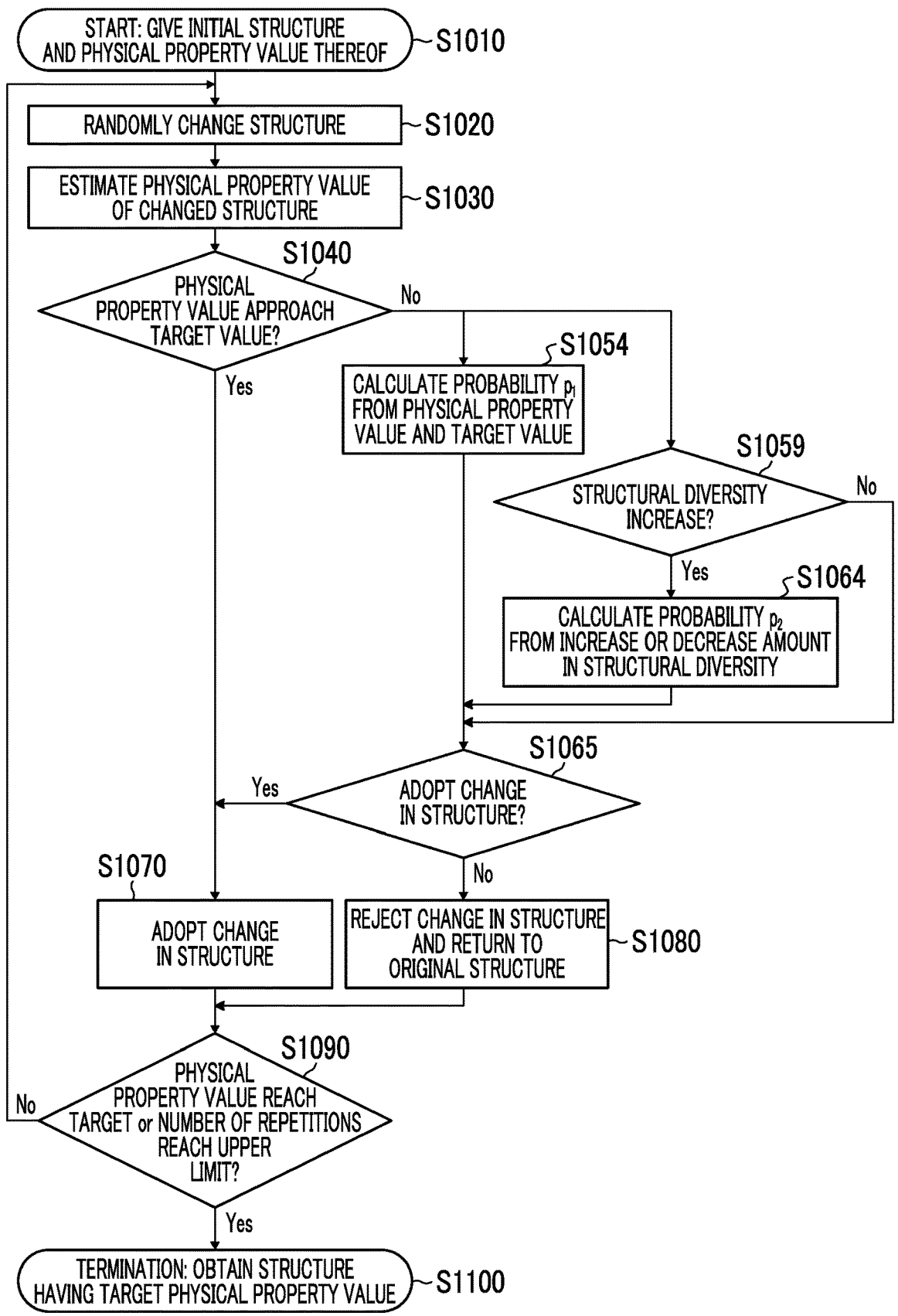
FIG. 20 is a flowchart showing a procedure of a method for searching a compound according to a third embodiment.
Figure 21:
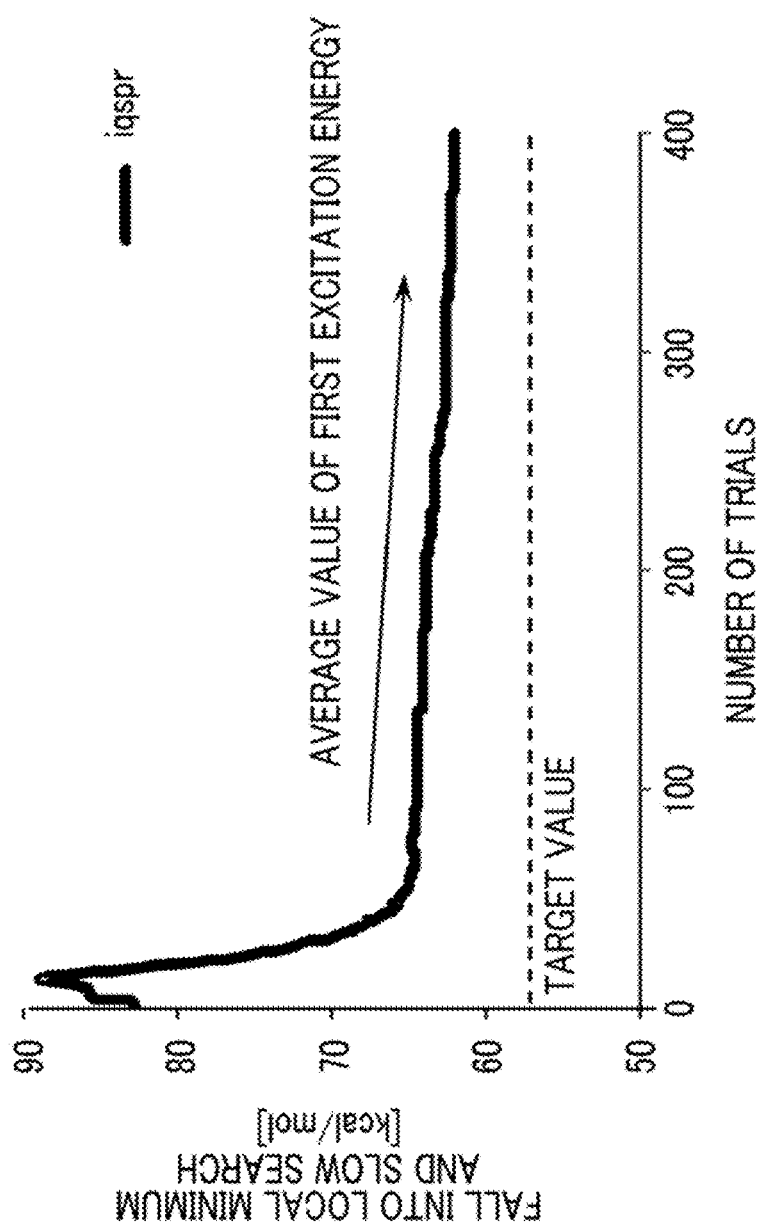
FIG. 21 is a diagram showing how to fall into a local minimum in the related art.
Figure 22A:
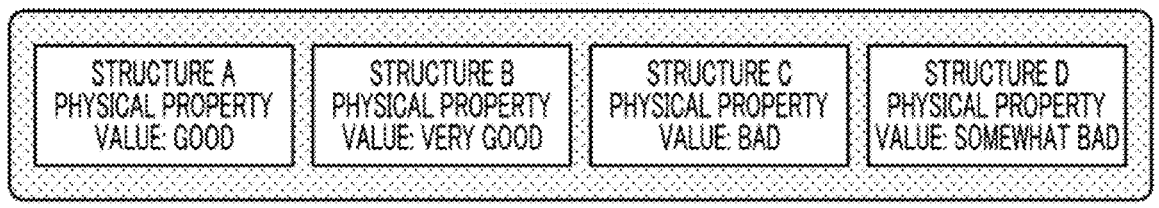
FIGS. 22A to 22C are diagrams of how the diversity of structures is reduced in the related art.
Figure 22B:
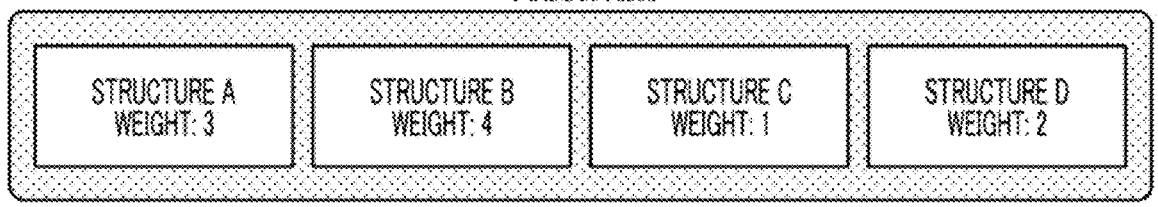
Figure 22C:
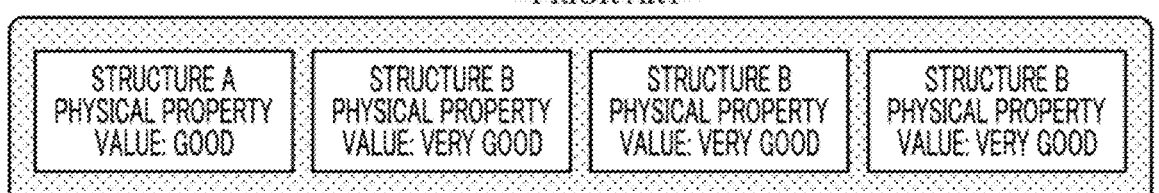

FIG. 20 is a flowchart showing a process of the method for searching a compound and program for searching a compound according to the third embodiment. In FIG. 20, the same step number is assigned to a step which performs the same process as in FIG. 3, and detailed description thereof will be omitted. In addition, a non-temporary and computer-readable recording medium, which causes a computer to execute the program according to the flowchart of FIG. 20 in a case where a command stored in the recording medium is read by the computer, is also an aspect of the third embodiment.

In a case where the candidate structure adoption part 108 (candidate structure adoption part) determines No (the physical property value does not approach the target value) in the step S1040, the process proceeds to a step S1054. In the step S1054, the candidate structure adoption part 108 calculates the probability p1 (first adoption probability) in the same manner as in the steps S1050 and S1062 described above (first calculation process).

In addition, in a case where the candidate structure adoption part 108 (candidate structure adoption part) determines No in the step S1040, the process proceeds to a step S1059. In the step S1059, the candidate structure adoption part 108 can determine whether or not the structural diversity increases by the "evaluation method of structural diversity (1)" or the "evaluation method of structural diversity (2)" as in the steps S1055 and S1052. On the other hand, in a case where the determination is affirmed in the step S1059, the process proceeds to a step S1064, the candidate structure adoption part 108 calculates the probability p2 (second adoption probability) in the same manner as in the steps S1060 and S1057 described above (second calculation process), and the process proceeds to a step S1065. The first calculation process and the second calculation process may be performed concurrently, or one of these may be performed first. However, whether to or not to adopt the candidate structure is determined after the probability p1 and the probability p2 are calculated.

In the step S1065, the candidate structure adoption part 108 decide whether to or not to adopt the candidate structure based on the probability p1 (first adoption probability) and the probability p2 (second adoption probability) (adoption process). For example, the candidate structure adoption part 108 can adopt the candidate structure with a "larger probability of the probabilities p1 and p2". In addition, the candidate structure may be adopted with a "smaller probability of the probabilities p1 and p2", an "average probability of the probabilities p1 and p2", a "simultaneous probability (=p1×p2) of the probabilities p1 and p2", or the like. The candidate structure adoption part 108 proceeds to the step S1070 with such a probability (adoption probability) and adopts the candidate structure (adoption process), and proceeds to the step S1080 with (1−adoption probability) and rejects the change in structure and returns to the original structure (rejection process).

In the step S1059, even in a case where the determination is denied (a case where the structural diversity does not increase), rather than immediately rejecting the change in structure, the candidate structure adoption part 108 leaves room for adoption of the change in structure (sets the probability p2 to 0 and proceeds to the step S1065).

Even in the case of the third embodiment described above, as the first and second embodiments, it is possible to efficiently search for the structure of the compound having a desired physical property value.

The embodiments and examples of the present invention have been described above, but the present invention is not limited to the above-described aspects, and various modifications are possible without departing from the gist of the present invention.

EXPLANATION OF REFERENCES

10: device for searching compound
100: processing part
102: input part
104: candidate structure acquisition part
106: physical property value calculation part
108: candidate structure adoption part
110: control part
112: display control part
120: CPU
122: ROM
124: RAM
200: storage part
300: display part
310: monitor
400: operation part
410: keyboard
420: mouse
500: external server
510: external database
1000: network
S1010 to S1100: each step of method for searching compound

What is claimed is:

1. A method for searching a compound executed by a device for searching a compound comprising a processor and a non-transitory and tangible memory, wherein the processor performs, by referring to the memory, comprising:
inputting a chemical structure of one or more compounds, one or more physical property values according to the chemical structure, and a target value of the physical property values;
acquiring a candidate structure by changing the chemical structure;
calculating the physical property value of the candidate structure;
adopting or rejecting a candidate structure, including:
performing a first adoption process to determine whether to or not to adopt the candidate structure based on whether or not the physical property value of the candidate structure approaches the target value of the physical property value due to the change in chemical structure,
in a case where the candidate structure is not adopted by the first adoption process, performing a second adoption process to determine whether to or not to adopt the candidate structure based on whether or not a structural diversity of a structural group composed of the chemical structure and the candidate structure increases due to the change in chemical structure; and
in a case where the candidate structure is not adopted by the first adoption process and the second adoption process, performing a rejection process to reject the change in chemical structure and return to the chemical structure before the change; and
controlling to repeat the inputting, the acquiring of the candidate structure, the calculating of the physical property value, and the adopting-or-rejecting of the candidate structure, until a termination condition is satisfied,
wherein in the adoption, the chemical structure before the change is replaced by the candidate structure, and
wherein in the rejection, the chemical structure before the change is not replaced by the candidate structure and the chemical structure before the change is maintained, and
wherein, as the first adoption process in the adopting-or-rejecting of the candidate structure, in a case where an absolute value of a difference between the physical property value of the candidate structure and the target value of the physical property value is equal to or less than an absolute value of a difference between the physical property value of the chemical structure and the target value of the physical property value, a process of adopting the candidate structure is performed, and
in a case where the absolute value of the difference between the physical property value of the candidate structure and the target value of the physical property value is more than the absolute value of the difference between the physical property value of the chemical structure and the target value of the physical property value, a process of calculating a first adoption probability from a first function based on the difference between the physical property value of the candidate structure and the target value of the physical property value and adopting the candidate structure with the first adoption probability is performed, and wherein, as the second adoption process in the adopting-or-rejecting of the candidate structure, a process of calculating an increase or decrease amount in the structural diversity of the structural group is performed, in a case where the increase or decrease amount indicates increase in the structural diversity, a process of calculating a second adoption probability from a second function and adopting the candidate structure with the second adoption probability is performed.

2. The method for searching a compound according to claim 1, wherein, in the adopting-or-rejecting of the candidate structure, a difference between a structural diversity of a first structural group composed of chemical structures before the change and a structural diversity of a second structural group composed of chemical structures after at least one change is calculated as the increase or decrease amount.

3. The method for searching a compound according to claim 1, wherein, in the adopting-or-rejecting of the candidate structure, a difference between a structural diversity of a first structural group including at least a part of structural groups after at least one change and a structural diversity of a second structural group obtained by adding the candidate structure to the first structural group is calculated as the increase or decrease amount.

4. The method for searching a compound according to claim 1, wherein the first function is a monotonically decreasing function with respect to a difference between the absolute value of the difference between the physical property value of the candidate structure and the target value of the physical property value, and the absolute value of the difference between the physical property value of the chemical structure and the target value of the physical property value.

5. The method for searching a compound according to claim 1, wherein the second function is a monotonically increasing function with respect to the increase or decrease amount in the structural diversity.

6. The method for searching a compound according to claim 1, wherein, in the acquiring of the candidate structure, an atom or an atomic group is added to or deleted from the chemical structure to generate an objective structure, and the objective structure is defined as the candidate structure.

7. The method for searching a compound according to claim 1, wherein, in the controlling to repeat, the termination condition is determined to be satisfied in a case where the number of times that the chemical structure is changed reaches a specified number of times and/or a case the physical property value of the candidate structure reaches the target value, and the inputting, the acquiring of the candidate structure, the calculating of the physical property value, and the adopting-or-rejecting of the candidate structure are terminated.

8. A non-transitory and computer-readable recording medium, which causes a computer to execute the method for searching a compound according to claim 1 in a case where a command stored in the recording medium is read by the computer.

9. The method for searching a compound according to claim 1, wherein the second adoption process is performed for the candidate structure, which is not adopted by the first adoption process, and the rejection process is performed for the candidate structure, which is not adopted by neither the first adoption process nor the second adoption process.

10. A method for searching a compound executed by a device for searching a compound comprising a processor and a non-transitory and tangible memory, wherein the processor performs, by referring to the memory, comprising:

inputting a chemical structure of one or more compounds, one or more physical property values according to the chemical structure, and a target value of the physical property values;

acquiring a candidate structure by changing the chemical structure;

calculating the physical property value of the candidate structure;

adopting or rejecting a candidate structure, including:

performing a second adoption process to determine whether to or not to adopt the candidate structure based on whether or not a structural diversity of a structural group composed of the chemical structure and the candidate structure increases due to the change in chemical structure, in a case where the candidate structure is not adopted by the second adoption process, performing a first adoption process to determine whether to or not to adopt the candidate structure based on whether or not the physical property value of the candidate structure approaches the target value of the physical property value due to the change in chemical structure, and in a case where the candidate structure is not adopted by the first adoption process and the second adoption process, performing a rejection process to reject the change in chemical structure and return to the chemical structure before the change; and controlling to repeat the inputting, the acquiring of the candidate structure, the calculating of the physical property value, and the adopting-or-rejecting of the candidate structure, until a termination condition is satisfied, wherein in the adoption, the chemical structure before the change is replaced by the candidate structure, wherein in the rejection, the chemical structure before the change is not replaced by the candidate structure and the chemical structure before the change is maintained, wherein, as the first adoption process in the adopting-or-rejecting of the candidate structure, in a case where an absolute value of a difference between the physical property value of the candidate structure and the target value of the physical property value is equal to or less than an absolute value of a difference between the physical property value of the chemical structure and the target value of the physical property value, a process of adopting the candidate structure is performed, and in a case where the absolute value of the difference between the physical property value of the candidate structure and the target value of the physical property value is more than the absolute value of the difference between the physical property value of the chemical structure and the target value of the physical property value, a process of calculating a first adoption probability from a first function based on the difference between the physical property value of the candidate structure and the target value of the physical property value and adopting the candidate structure with the first adoption probability is performed, and wherein, as the second adoption process in the adopting-or-rejecting of the candidate structure, a process of calculating an increase or decrease amount in the structural diversity of the structural group is performed, in a case where the increase or decrease amount indicates increase in the structural diversity, a process of calculating a second adoption probability from a second function and adopting the candidate structure with the second adoption probability is performed.

11. A non-transitory and computer-readable recording medium, which causes a computer to execute the method for searching a compound according to claim 10 in a case where a command stored in the recording medium is read by the computer.

12. The method for searching a compound according to claim 10, wherein the first adoption process is performed for the candidate structure, which is not adopted by the second adoption process, and the rejection process is performed for the candidate structure, which is not adopted by neither the first adoption process nor the second adoption process.

* * * * *